(12) United States Patent
Tomita

(10) Patent No.: US 8,489,891 B2
(45) Date of Patent: Jul. 16, 2013

(54) METHOD FOR LIMITING SERVICE, METHOD FOR LIMITING IMAGE PROCESSING AND IMAGE PROCESSING SYSTEM

(75) Inventor: Atsushi Tomita, Toyohashi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1493 days.

(21) Appl. No.: 11/984,038

(22) Filed: Nov. 13, 2007

(65) Prior Publication Data

US 2008/0162941 A1 Jul. 3, 2008

(30) Foreign Application Priority Data

Dec. 27, 2006 (JP) .................................. 2006-352276

(51) Int. Cl.
*H04L 29/06* (2006.01)
(52) U.S. Cl.
USPC ......................................................... 713/185
(58) Field of Classification Search
None
See application file for complete search history.

(56) References Cited

U.S. PATENT DOCUMENTS

| | | | |
|---|---|---|---|
| 2003/0133151 | A1 | 7/2003 | Tamai et al. |
| 2004/0184064 | A1* | 9/2004 | TaKeda et al. ............... 358/1.13 |
| 2004/0223182 | A1 | 11/2004 | Minagawa |
| 2005/0163549 | A1 | 7/2005 | Shima et al. |
| 2006/0044586 | A1 | 3/2006 | Kujirai et al. |
| 2006/0232810 | A1* | 10/2006 | Kishino ...................... 358/1.13 |
| 2006/0279773 | A1 | 12/2006 | Sakurai et al. |

FOREIGN PATENT DOCUMENTS

| | | |
|---|---|---|
| JP | 2003-196056 | 7/2003 |
| JP | 2003-348079 | 12/2003 |
| JP | 2004-265061 | 9/2004 |
| JP | 2005-031784 | 2/2005 |
| JP | 2005-074772 | 3/2005 |
| JP | 2005-182688 A | 7/2005 |
| JP | 2005-327091 | 11/2005 |
| JP | 2006-099747 | 4/2006 |
| JP | 2006-191195 | 7/2006 |
| JP | 2006-344173 | 12/2006 |
| WO | WO 2004/022350 | 3/2004 |

OTHER PUBLICATIONS

Japanese Official Communication dated May 26, 2009 for corresponding Japanese Patent Application No. 2006-352276.
Notification of Reason(s) for Refusal in JP 2006-352276 dated Nov. 4, 2008, and a English Translation thereof.

* cited by examiner

*Primary Examiner* — Gilberto Barron, Jr.
*Assistant Examiner* — Simon Kanaan
(74) *Attorney, Agent, or Firm* — Buchanan Ingersoll & Rooney PC

(57) ABSTRACT

A driver management apparatus is installed in a system including an image forming apparatus and plural information processing apparatuses. The driver management apparatus sends the information processing apparatus a driver for the image forming apparatus with a first key incorporated. The driver is so set that printing processing conditions whose designation with the information processing apparatus is prohibited cannot be designated. Further, the driver management apparatus sends the first key to the image forming apparatus. The information processing apparatus uses the driver sent by the driver management apparatus to generate print data and encrypts the generated print data using the first key incorporated into the driver, and sends the encrypted print data to the image forming apparatus. The image forming apparatus decodes the print data received from the information processing apparatus using a second key of the information processing apparatus and performs a printing process using the decoded print data.

15 Claims, 26 Drawing Sheets

| IMAGE FORMING APPARATUS NAME | IP ADDRESS |
|---|---|
| IMAGE FORMING APPARATUS 1-1 | 192.168.1.1 |
| IMAGE FORMING APPARATUS 1-2 | 192.168.1.2 |
| IMAGE FORMING APPARATUS 1-3 | 192.168.1.3 |
| IMAGE FORMING APPARATUS 1-4 | 192.168.1.4 |
| IMAGE FORMING APPARATUS 1-5 | 192.168.1.5 |
| ⋮ | ⋮ |

FIG. 8

| DEVICE NAME | IP ADDRESS | PRINTING CONDITIONS (CONDITIONS PATTERN NAME) |
|---|---|---|
| INFORMATION PROCESSING APPARATUS 3-1 | 192.168.10.1 | NO LIMITATIONS |
| INFORMATION PROCESSING APPARATUS 3-2 | 192.168.10.2 | MONOCHROME PRINTING |
| INFORMATION PROCESSING APPARATUS 3-3 | 192.168.10.3 | MONOCHROME PRINTING |
| INFORMATION PROCESSING APPARATUS 3-4 | 192.168.10.4 | MONOCHROME PRINTING |
| INFORMATION PROCESSING APPARATUS 3-5 | 192.168.10.5 | NO LIMITATIONS |
| ... | ... | ... |

FIG. 9A

PRINTING CONDITIONS SETTING LIST

| DEVICE NAME | PRINTING CONDITIONS |
|---|---|
| INFORMATION PROCESSING APPARATUS 3-1 | NO LIMITATIONS |
| INFORMATION PROCESSING APPARATUS 3-2 | MONOCHROME PRINTING |
| INFORMATION PROCESSING APPARATUS 3-3 | MONOCHROME PRINTING |
| INFORMATION PROCESSING APPARATUS 3-4 | SINGLE SIDED PRINTING PROHIBITED |
| INFORMATION PROCESSING APPARATUS 3-5 | MONOCHROME/SINGLE SIDED PRINTING PROHIBITED |

LT1

- ADD INFORMATION PROCESSING APPARATUS
- CHANGE INFORMATION PROCESSING APPARATUS
- ADD CONDITIONS
- CHANGE CONDITIONS
- OK
- CANCEL

PRINTING CONDITIONS SETTING LIST

| DEVICE NAME | PRINTING CONDITIONS |
|---|---|
| INFORMATION PROCESSING APPARATUS 3-1 | NO LIMITATIONS |
| INFORMATION PROCESSING APPARATUS 3-2 | MONOCHROME PRINTING |
| INFORMATION PROCESSING APPARATUS 3-3 | MONOCHROME PRINTING |
| INFORMATION PROCESSING APPARATUS 3-4 | MONOCHROME PRINTING ▼ |
| INFORMATION PROCESSING APPARATUS 3-5 | NO LIMITATIONS |
| | MONOCHROME PRINTING |
| | SINGLE SIDED PRINTING PROHIBITED |
| | MONOCHROME/ SINGLE SIDED PRINTING PROHIBITED |

LT1

- ADD INFORMATION PROCESSING APPARATUS
- CHANGE INFORMATION PROCESSING APPARATUS
- ADD CONDITIONS
- CHANGE CONDITIONS
- OK
- CANCEL

| INFORMATION PROCESSING APPARATUS SETTING |
|---|

DEVICE NAME : INFORMATION PROCESSING APPARATUS 3-6

IP ADDRESS : 192.168.10.6

OK    CANCEL

| PRINTING CONDITIONS (CONDITIONS PATTERN NAME) | COLOR | PRINTING SURFACE | STAPLING |
|---|---|---|---|
| NO LIMITATIONS | NO LIMITATIONS | NO LIMITATIONS | NO LIMITATIONS |
| MONOCHROME PRINTING | MONOCHROME PRINTING | NO LIMITATIONS | NO LIMITATIONS |
| SINGLE SIDED PRINTING PROHIBITED | NO LIMITATIONS | SINGLE SIDED PRINTING PROHIBITED | NO LIMITATIONS |
| MONOCHROME/SINGLE SIDED PRINTING PROHIBITED | MONOCHROME PRINTING | SINGLE SIDED PRINTING PROHIBITED | NO LIMITATIONS |

FIG. 12A

| PRINTING CONDITIONS SETTING | |
|---|---|
| PRINTING CONDITIONS NAME : | MONOCHROME PRINTING |
| COLOR : | MONOCHROME PRINTING ▼ |
| PRINTING SURFACE : | NO LIMITATIONS ▼ |
| STAPLING : | NO LIMITATIONS ▼ |

[ OK ]  [ CANCEL ]

| PRINTING CONDITIONS SETTING | |
|---|---|
| PRINTING CONDITIONS NAME : | MONOCHROME PRINTING |
| COLOR : | MONOCHROME PRINTING ▼ / NO LIMITATIONS / MONOCHROME PRINTING |
| PRINTING SURFACE : | NO LIMITATIONS ▼ / NO LIMITATIONS / SINGLE SIDED PRINTING PROHIBITED |
| STAPLING : | NO LIMITATIONS ▼ / NO LIMITATIONS / STAPLING PROHIBITED |

[ OK ]  [ CANCEL ]

HG3

METHOD FOR LIMITING SERVICE, METHOD FOR LIMITING IMAGE PROCESSING AND IMAGE PROCESSING SYSTEM

This application is based on Japanese patent application No. 2006-352276 filed on Dec. 27, 2006, the contents of which are hereby incorporated by reference.

BACKGROUND OF THE INVENTION

1. Field of the Invention

The present invention relates to a method for limiting the use of an image forming apparatus such as an MFP, and a system including the image forming apparatus.

2. Description of the Related Art

Image forming apparatuses called Multi Function Peripherals (MFPs) are prevalent in offices and others. Such image forming apparatuses have various functions including a copy function, a scanner function and a FAX function.

Image forming apparatuses have recently been equipped with a network function. Along with this, image forming apparatuses come to be used with other devices such as personal computers provided in the same network. For example, the network function enables an image forming apparatus to print a document prepared by a personal computer.

A driver for image forming apparatus (particularly, a printer driver in this case) is installed on a personal computer in order to generate data that is used for an image forming apparatus to print a document (hereinafter referred to as "print data").

The printer driver converts drawing commands issued by an operating system of a personal computer or an application program into print data written in page description language that can be processed by an image forming apparatus. Then, the printer driver transfers the converted print data to the image forming apparatus.

In addition, along with a significant improvement in performance of personal computers, printer drivers have recently appeared by which the conversion into bitmap images can be performed in personal computers. Before that, the conversion into bitmap images had been performed in image forming apparatuses.

Image forming apparatuses have been equipped with various functions in addition to the network function. For example, image forming apparatuses have been equipped with functions including a color printing function, a duplex printing function and a stapling function.

Some of these functions, for example, the color printing function, are expensive compared to conventional cases. In contrast, other functions, for example, the duplex printing function can reduce the cost.

If the decision whether these functions are used is completely left to a user of each personal computer, then a possibility may arise that the cost is increased.

There is proposed a method for reducing the operational cost of an image forming apparatus used in cooperation with a personal computer or others, e.g., a method disclosed in Japanese unexamined patent publication No. 2005-182688. According to this method, a printer driver management device manages a printing type whose execution is allowed by a terminal. In response to a request to download a printer driver, the printer driver management device specifies a module of a printer driver to be transmitted to a download destination on the basis of the printing type whose execution is allowed by a terminal as the download destination. The printer driver management device transmits the specified module to the download destination.

Accordingly, this method enables a setting, on a terminal basis, of a printing type that can be executed in the same image forming apparatus, and enables forced prohibition of the execution of printing types other than the set printing type. Accordingly, on a terminal basis, it is possible to prohibit the use of an expensive function or to force the use of a function that is effective in reducing the cost.

Incidentally, in many cases, manufacturers of image forming apparatuses have recently established a Web site from which anybody can download a driver freely.

Accordingly, even if each personal computer is given a driver where printing conditions are limited using the method described in Japanese unexamined patent publication No. 2005-182688, a case may arise in which a driver having no limitations on printing conditions is obtained from the Web site and is used. If such is the case, an advantage of the cost reduction cannot be obtained.

SUMMARY

The present disclosure is directed to solve the problems pointed out above, and therefore, an object of an embodiment of the present invention is to place limitations on the use of a service provided by an image forming apparatus for a client such as a personal computer more reliably than ever before.

According to an embodiment of the present invention, a method for limiting a service in a network system that includes a server that provides a service and one or more clients that are served is provided. The method includes giving option designation permission information and a first key to the client with the option designation permission information associated with the first key, the option designation permission information indicating, among options of the service, an option that is allowed to be designated by the client or an option that is prohibited from being designated by the client, giving the sever a second key corresponding to the first key of each of the clients, performing, by the client, processing of generating service content data within a range of options that are indicated in the option designation permission information of the client itself and can be designated, the service content data indicating a content of the service to be obtained from the server, performing, by the client, processing of encrypting the service content data thus generated using the first key of the client itself, performing, by the client, processing of sending the service content data thus encrypted to the server, performing, by the server, processing of decoding the service content data received from the client using the second key of the client, and performing, by the server, processing for the service based on the service content data thus decoded.

According to another embodiment of the present invention, a method for limiting a service in a network system that includes a server that provides a service and one or more clients that are served is provided. The method includes giving option designation permission information and a first identifier to the client with the option designation permission information associated with the first identifier, the option designation permission information indicating, among options of the service, an option that is allowed to be designated by the client or an option that is prohibited from being designated by the client, giving the sever a second identifier corresponding to the first identifier of each of the clients, performing, by the client, processing of generating service content data within a range of options that are indicated in the option designation permission information of the client itself and can be designated, the service content data indicating a content of the service to be obtained from the server, performing, by the client, processing of sending to the server the service content data thus generated together with the first identifier of the client itself, performing, by the server, processing of determining whether or not the first identifier received from the client and the second identifier of the client have a predetermined relationship. And performing, by the server, processing for the service based on the service content data that is received together with the first identifier only in the case where it is determined that the first identifier received from the client and the second identifier of the client have the predetermined relationship.

The structure described above makes it possible to place limitations on the use of a service provided by an image forming apparatus for a client such as a personal computer more reliably than ever before.

These and other characteristics and objects of the present invention will become more apparent by the following descriptions of preferred embodiments with reference to drawings.

BRIEF DESCRIPTION OF THE DRAWINGS

FIG. 7 shows an example of an image forming apparatus management table.

FIG. 8 shows an example of a printing conditions setting table.

FIGS. 9A and 9B show an example of a printing conditions setting list screen.

FIG. 10 shows an example of an information processing apparatus setting screen.

FIG. 11 shows an example of a printing conditions pattern table.

FIGS. 12A and 12B show an example of a printing conditions setting screen.

DESCRIPTION OF THE PREFERRED EMBODIMENTS

First Embodiment

Figure 1:
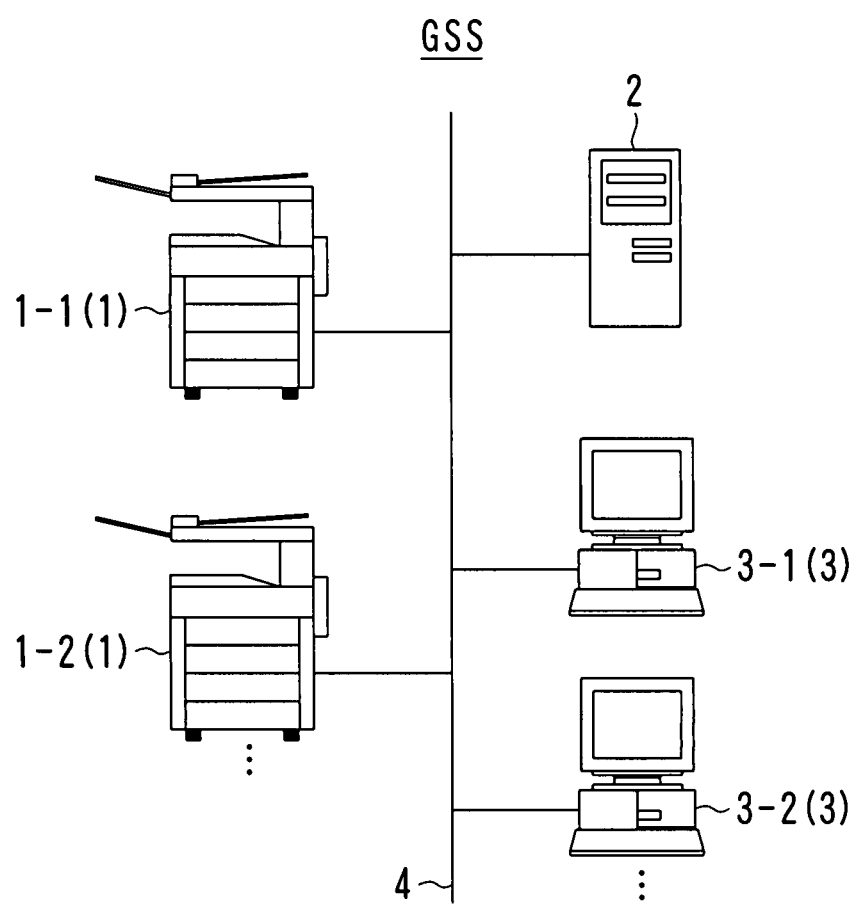
FIG. 1 is a diagram showing an example of the entire configuration of an image processing system.

As shown in FIG. 1, an image processing system GSS according to an embodiment of the present invention includes a plurality of image forming apparatuses 1-1, 1-2, ..., a driver management apparatus 2, a plurality of information processing apparatuses 3-1, 3-2, ... and a communication line 4. Hereinafter, the image forming apparatuses 1-1, 1-2, ... are collectively referred to as "image forming apparatuses 1". Likewise, the information processing apparatuses 3-1, 3-2, ... are collectively referred to as "information processing apparatuses 3".

Each of the image forming apparatuses 1, the driver management apparatus 2 and each of the information processing apparatuses 3 can be interconnected via the communication line 4. The communication line 4 can be a LAN line, a wireless communication line, a public line, a dedicated line or the Internet.

The image processing system GSS is established in an organization such as a company or a public office and is used by a person belonging to such an organization, e.g., by an employee. Hereinafter, such a person is referred to as a "user".

The image forming apparatus 1 is an image processing apparatus into which various functions such as a copy function, a scanner function, a FAX transmission function, a FAX reception function, a PC print function, a scanning transmission function, and a box function are integrated. The image forming apparatuses 1 are sometimes called Multi Function Peripherals (MFPs).

The "PC print" function is a function to print an image on a sheet of paper by receiving image data from the information processing apparatus 3. This function is sometimes called a "network printer function" or a "network printing function", for example.

The "scanning transmission function" is a function to send image data of an original image captured with a scanner to an apparatus designated by a user based on a TCP/IP and a protocol relating thereto (an electronic mail protocol or an FTP). This function is sometimes called "SCAN-TO-Email" or "SCAN-TO-FTP" depending on a method of sending image data.

The "box function" is a function to provide a storage area called, for example, a "box" or a "personal box" corresponding to a folder or a directory in a personal computer for each user, thereby enabling the user to store, in user's own storage area, document data such as an image file. The box function is sometimes called a "document server function".

Figure 2:
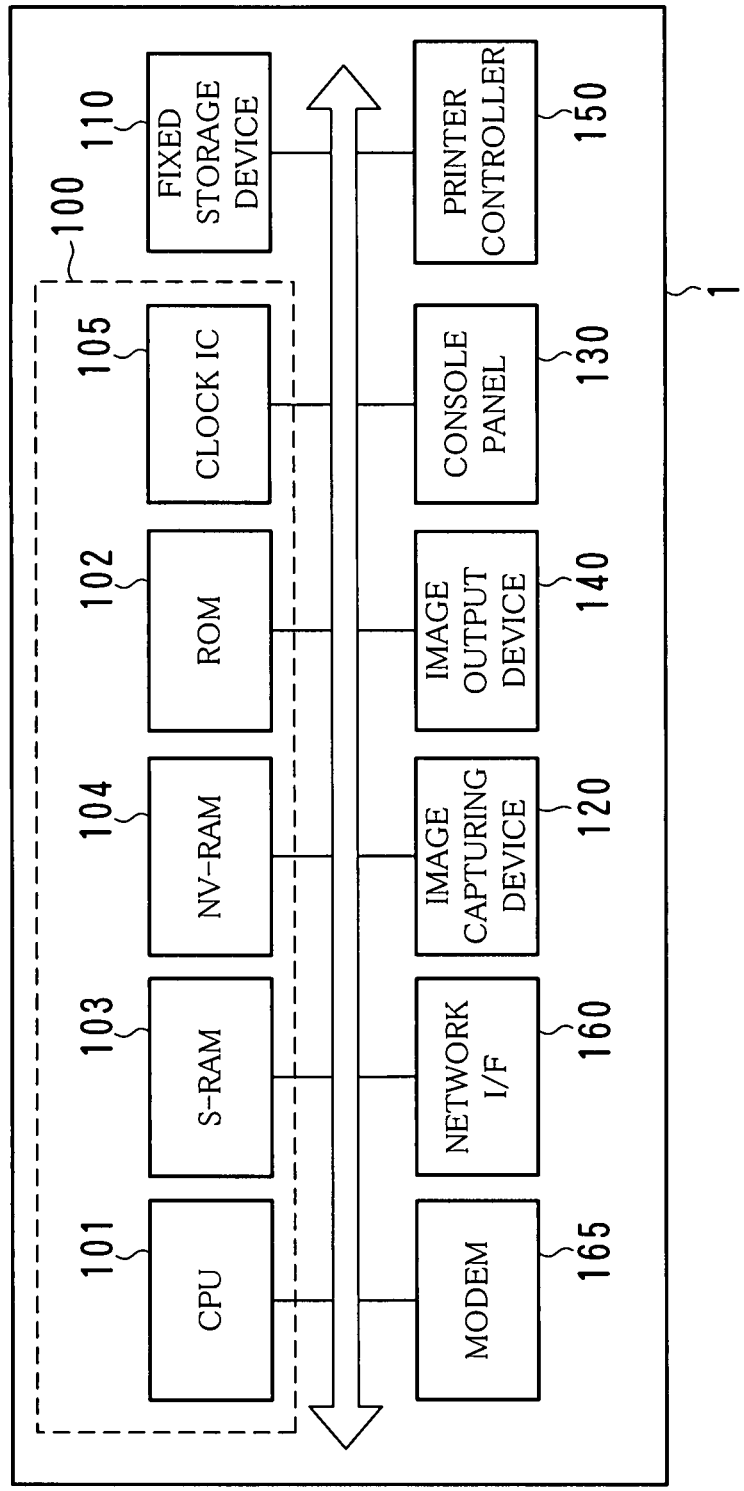
FIG. 2 is a diagram showing an example of a hardware configuration of an image forming apparatus.

Referring to FIG. 2, the image forming apparatus 1 includes an entire control portion 100, a fixed storage device 110, an image capturing device 120, a console panel 130, an image output device 140, a printer controller 150, a network interface 160, a modem 165 and various other circuits.

The entire control portion 100 includes a CPU 101, a ROM 102, a Static Random Access Memory (S-RAM) 103, a Non-Volatile Random Access Memory (NV-RAM) 104 and a clock Integrated Circuit (IC) 105.

The S-RAM 103 is a storage device for working and is used to temporarily store a result of processing conducted by the CPU 101 or data sent from other apparatus.

The NV-RAM 104 is used to back up data relating to various settings of the image forming apparatus 1 itself, e.g., an IP address, a FAX number, an address book, a font size or language on a screen. The clock IC 105 is a timing circuit.

Figure 3:
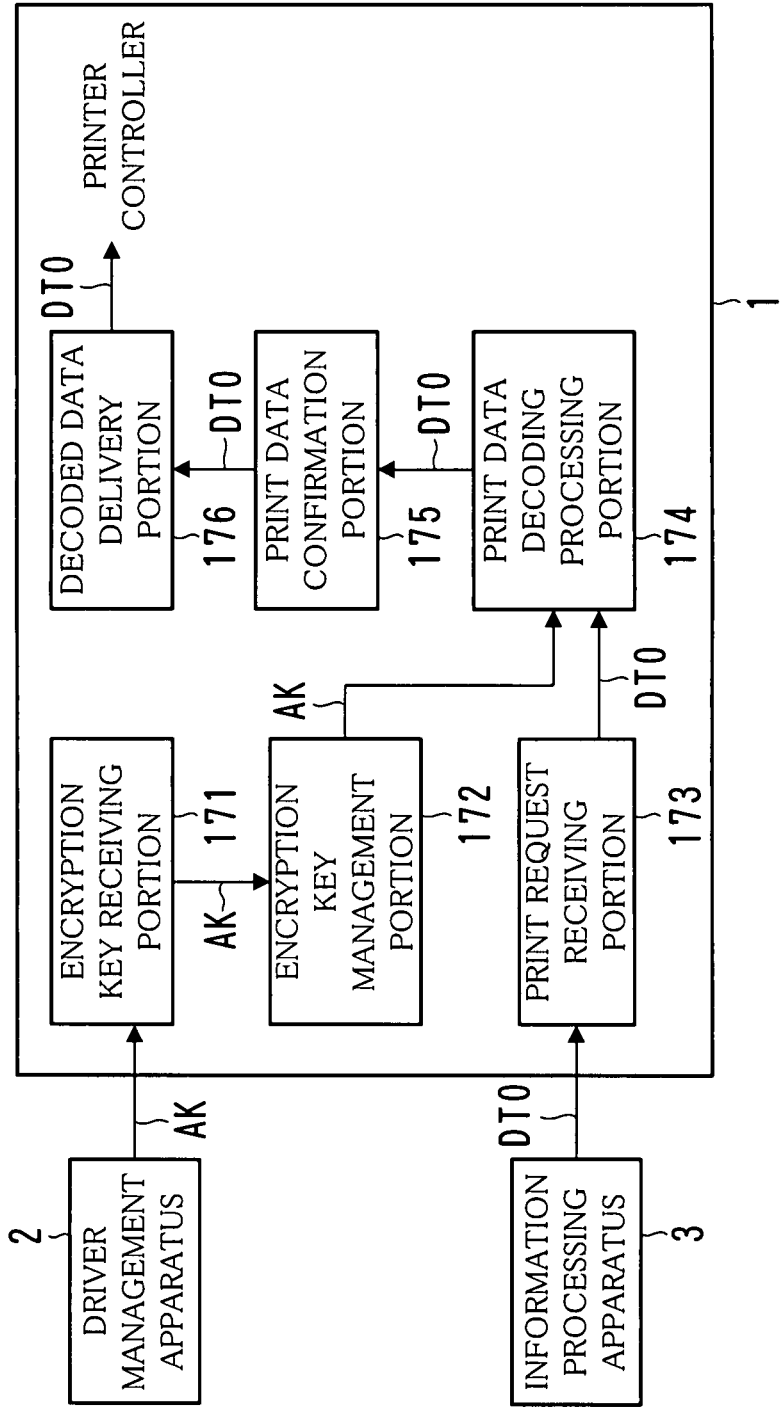
FIG. 3 is a diagram showing an example of a functional configuration of an image forming apparatus.

The ROM 102 stores a control program for achieving functions including an encryption key receiving portion 171, an encryption key management portion 172, a print request receiving portion 173, a print data decoding processing portion 174, a print data confirmation portion 175 and a decoded data delivery portion 176, all of which are shown in FIG. 3. The control program is conducted by the CPU 101.

The fixed storage device 110 is a fixed-type (internal) mass storage medium. The fixed storage device 110 can be, for example, a hard disk drive. A part or the whole of the control program may be stored in the fixed storage device 110 instead of the ROM 102. Then, the control program may be called out to the S-RAM 103 as needed so that the CPU 101 executes the control program thus called out. Alternatively, a part or the whole of the functions shown in FIG. 3 may be achieved by a circuit.

The image capturing device 120 optically reads document images including text, numerical expressions, symbols, photographs, diagrams or illustrations that are depicted on a sheet of paper, and generates image data.

The printer controller 150 controls the image output device 140 so that an image is formed based on image data obtained with the image capturing device 120 or print data sent from the information processing apparatus 3, i.e., converts the image data or the print data into a bitmap image and the image is printed. The image output device 140 prints the image on a sheet of paper in accordance with a control signal supplied from the printer controller 150.

The console panel 130 is made up of a touch panel, a numeric keypad and others. The console panel 130 is used for displaying a screen for providing a user with messages or instructions and a screen for the user to enter desired types of processing and processing conditions. The console panel 130 is also used in order that the user enters instructions for job execution or designation of execution conditions for jobs.

The network interface 160 is a Network Interface Card (NIC) for performing data communication with other apparatus using a protocol such as a TCP/IP.

The modem 165 is an interface for performing data communication with a FAX terminal outside the image processing system GSS via a public line using a FAX protocol such as G3 or G4.

Figure 4:
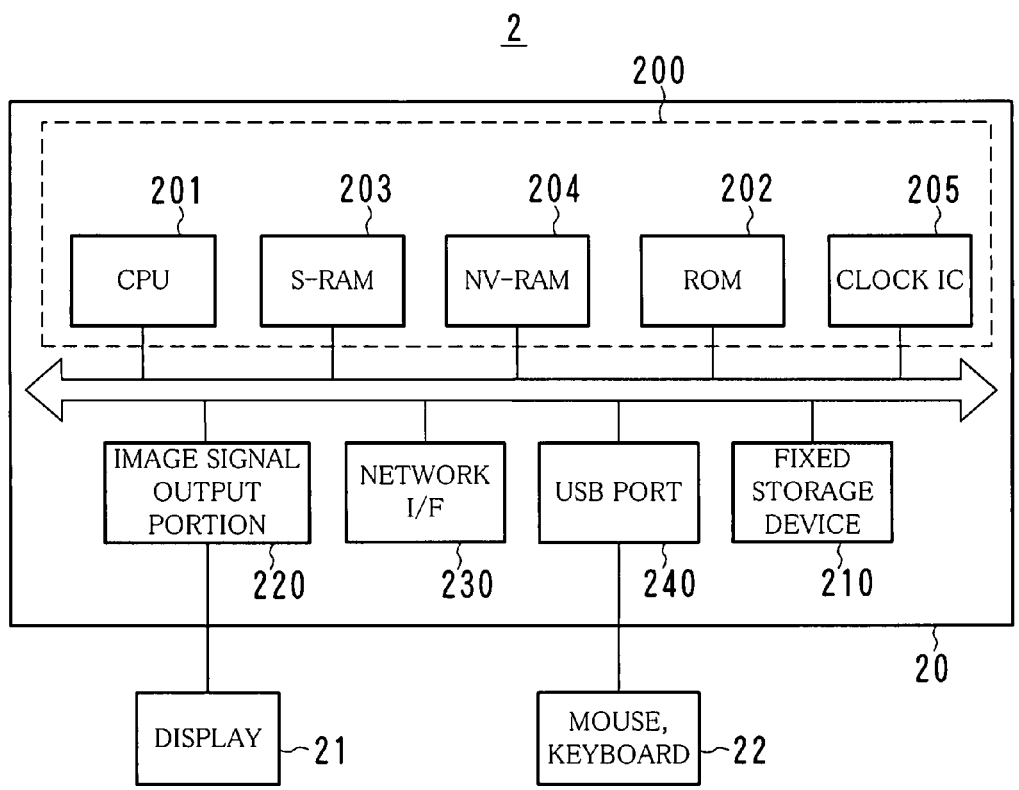
FIG. 4 is a diagram showing an example of a hardware configuration of a driver management apparatus.

Referring to FIG. 4, the driver management apparatus 2 includes a driver management apparatus body 20, a display 21 and an input device 22 such as a mouse or a keyboard.

The driver management apparatus body 20 includes an entire control portion 200, a fixed storage device 210, an image signal output portion 220, a network interface 230 and a USB port 240.

The entire control portion 200 includes a CPU 201, a ROM 202, an S-RAM 203, an NV-RAM 204 and a clock IC 205.

The S-RAM 203 is a storage device for working and is used to temporarily store a result of processing conducted by the CPU 201 or data sent from other apparatus.

The NV-RAM 204 is used to back up data relating to various settings of the driver management apparatus 2 itself, e.g., an IP address. The clock IC 205 is a timing circuit.

Figure 5:
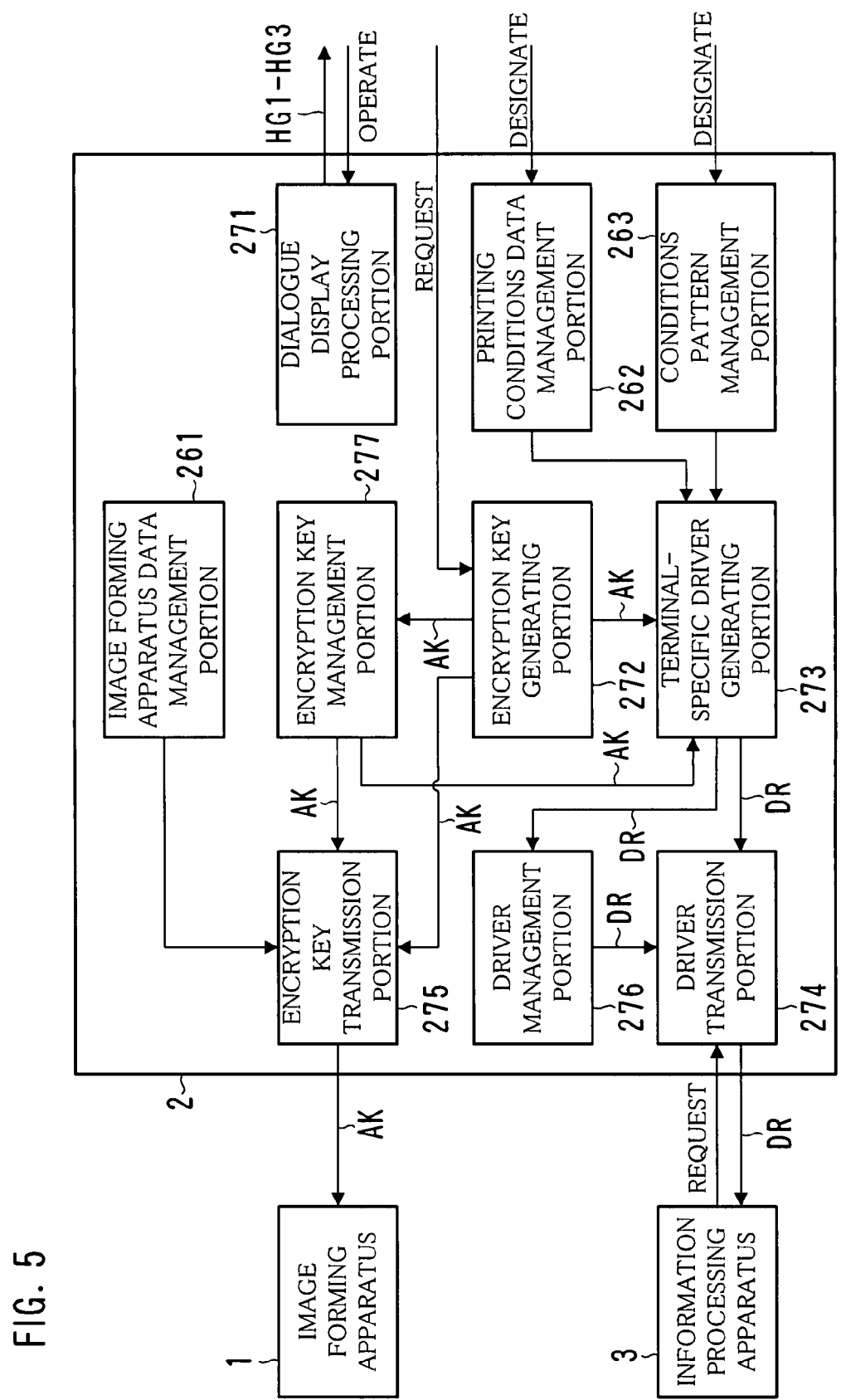
FIG. 5 is a diagram showing an example of a functional configuration of a driver management apparatus.

The fixed storage device 210 is a fixed-type (internal) mass storage medium. The fixed storage device 210 can be, for example, a hard disk drive. The fixed storage device 210 stores a control program for achieving functions including an image forming apparatus data management portion 261, a printing conditions data management portion 262, a conditions pattern management portion 263, a dialogue display processing portion 271, an encryption key generating portion 272, a terminal-specific driver generating portion 273, a driver transmission portion 274, an encryption key transmission portion 275, a driver management portion 276 and an encryption key management portion 277, all of which are shown in FIG. 5. The control program is called out to the S-RAM 203 as needed so that the CPU 201 executes the control program thus called out. A part or the whole of the functions shown in FIG. 5 may be achieved by a circuit. Other than the above, the fixed storage device 210 stores a driver, which is to be given to an information processing apparatus 3, of an image forming apparatus 1.

The driver management apparatus 2 can be, for example, a so-called server machine, a workstation or a personal computer.

Figure 6:
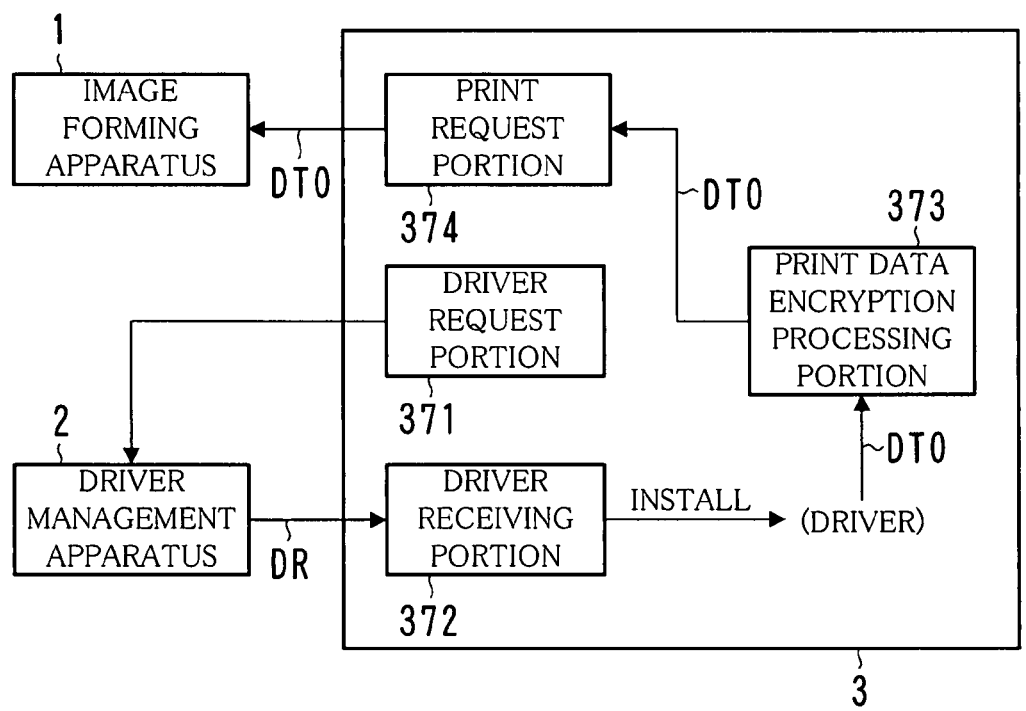
FIG. 6 is a diagram showing an example of a functional configuration of an information processing apparatus.

The information processing apparatus 3 is a client (terminal) that receives a service provided by the image forming apparatus 1. A hardware configuration of the information processing apparatus 3 is basically the same as that of the driver management apparatus 2. However, on the hard disk drive of the information processing apparatus 3 are installed an operating system, an application program for creating a document, an application program for creating an image, a driver for controlling the image forming apparatus 1 and a control program for achieving functions including a driver request portion 371, a driver receiving portion 372, a print data encryption processing portion 373 and a print request portion 374 that are shown in FIG. 6.

In addition to the above, due to the work by an administrator, information such as IP addresses or others of the driver management apparatus 2 and each of the image forming apparatuses 1 is previously stored in the hard disk drive of the information processing apparatus 3.

In the information processing apparatus 3, when the operating system or the application program issues a drawing command for PC print, a driver (a printer driver) of the image forming apparatus 1 converts data into print data that can be processed by the image forming apparatus 1. The print data has a format in which print command data of a document described in Printer Description Language (PDL) such as PCL or PostScript is covered with Print Job Language (PJL) that is language for controlling a print job.

The print data is sent to the image forming apparatus 1, which enables the image forming apparatus 1 to perform a printing process. Note that a driver can be used in common for all of the image forming apparatuses 1.

In this embodiment, it is possible to limit, for each information processing apparatus 3, conditions for PC print that can be designated by a user. Hereinafter, such conditions are referred to as "printing conditions". A driver is prepared depending on the content of the limitations and is given from the driver management apparatus 2 to the information processing apparatus 3. Unless the information processing apparatus 3 is given a driver by the driver management apparatus 2, the information processing apparatus 3 cannot request the image forming apparatus 1 to perform PC print. This will be detailed later.

Further, the information processing apparatus 3 can receive image data of an image scanned by the image forming apparatus 1 using the scanning transmission function of the image forming apparatus 1.

A personal computer, a workstation or the like is used as the information processing apparatus 3.

The following is a description of the processing content of each of the portions included in the image forming apparatus 1 shown in FIG. 3, of each of the portions included in the driver management apparatus 2 shown in FIG. 5, and of each of the portions included in the information processing apparatus 3 shown in FIG. 6. In the description, the processing content is broadly divided into processing for preparing an environment where PC print is performed, and processing at the time of the execution of the PC print.

[Processing for Preparing Environment Where PC Print is Performed]

Referring to FIG. 5, the image forming apparatus data management portion 261 of the driver management apparatus 2 includes an image forming apparatus management table TB1 and serves to manage data on each of the image forming apparatuses 1 installed in the image processing system GSS.

As shown in FIG. 7, the image forming apparatus management table TB1 stores data indicating a name (an image forming apparatus name) and an IP address of each of the image forming apparatuses 1 installed in the image processing system GSS. The content of the image forming apparatus management table TB1 is entered, in advance, by an administrator.

The printing conditions data management portion 262 includes a printing conditions setting table TB2 and serves to manage data on printing conditions that are set (limited) for each information processing apparatus 3.

As shown in FIG. 8, in the printing conditions setting table TB2 is registered a record for each information processing apparatus 3 to which the driver of the image forming apparatus 1 is given. If no information processing apparatus 3 is given a driver, no single record is registered. Every time when a driver is newly given to the information processing apparatus 3, a record for the information processing apparatus 3 is registered. The content of the record is described later.

The dialogue display processing portion 271 performs processing for displaying on the display 21 a screen (a so-called dialogue-box) for an administrator to enter limitations on printing conditions for each information processing apparatus 3.

If an administrator operates the input device 22 of the driver management apparatus 2 to enter a predetermined command, then the dialogue display processing portion 271 causes the display 21 to display a printing conditions setting list screen HG1 as shown in FIG. 9A.

A terminal-specific conditions list LT1 and various buttons are placed in the printing conditions setting list screen HG1. The terminal-specific conditions list LT1 shows which printing conditions are set for each of the information processing apparatuses 3 to which a driver is given. If no information processing apparatus 3 is given a driver, nothing is shown in the terminal-specific conditions list LT1.

In the case where an administrator newly gives a driver to any of the information processing apparatuses 3, the administrator performs the following operation. In addition, in accordance with the operation performed by the administrator, each portion of the driver management apparatus 2 causes the display 21 to display the screens described below.

The administrator clicks the "add information processing apparatus" button in the printing conditions setting list screen HG1. In response to this, the dialogue display processing portion 271 displays an information processing apparatus setting screen HG2 as shown in FIG. 10 so as to be overlaid on the printing conditions setting list screen HG1.

Here, the administrator enters a device name and an IP address of the information processing apparatus 3 to click the "OK" button.

In response to this, the printing conditions data management portion 262 registers a record for the information processing apparatus 3 in the printing conditions setting table TB2 (see FIG. 8). The entered device name and IP address of the information processing apparatus 3 are stored in the corresponding fields of "device name" and "IP address" of the record, respectively.

The dialogue display processing portion 271 closes the information processing apparatus setting screen HG2 and makes the printing conditions setting list screen HG1 active. At this time, a line (record) for the information processing apparatus 3 is added to the terminal-specific conditions list LT1. Among cells of the line, in the cell for the "device name" is indicated the device name of the information processing apparatus 3, which was entered by the administrator, while nothing is shown in the cell for the "printing conditions".

Incidentally, the administrator can prepare a plurality of patterns of printing conditions (hereinafter referred to as "conditions patterns") and select printing conditions to be given to the information processing apparatus 3 from among the prepared conditions patterns. The conditions pattern management portion 263 includes a printing conditions pattern table TB3 and manages conditions patterns.

Referring to FIG. 11, one record is registered for each conditions pattern in the printing conditions pattern table TB3. Data showing a name of the corresponding conditions pattern (a pattern name) is stored in the field "printing conditions".

Data indicating limitations relating to a color, a printing surface and stapling concerning the corresponding conditions pattern are stored in the fields "color", "printing surface" and "stapling", respectively.

Specifically, either "no limitations" or "monochrome printing" is stored in the field "color". Here, "no limitations" means that any of color printing and monochrome printing can be designated, and "monochrome printing" means that only the designation of monochrome printing is allowed and the designation of color printing is prohibited.

Either "no limitations" or "single sided printing prohibited" is stored in the field "printing surface". Here, "no limitations" means that any of single sided printing and duplex printing can be designated, and "single sided printing prohibited" means that the designation of single sided printing is prohibited.

Either "no limitations" or "stapling prohibited" is stored in the field "stapling". Here, "no limitations" means that stapling a printed material can be designated, and "stapling prohibited" means that stapling a printed material is prohibited.

Referring back to FIG. 9A, the administrator clicks, in the terminal-specific conditions list LT1, the field "printing conditions" of the line for the information processing apparatus 3 to which the administrator desires to give a driver. Responsive to this, as shown in FIG. 9B, the dialogue display processing portion 271 displays a pull-down menu for conditions patterns registered in the printing conditions pattern table TB3 with pattern names being indexes.

Here, the administrator selects any one of the conditions patterns and thereby can set printing conditions for the information processing apparatus 3. After the selection, the administrator clicks the "OK" button.

In response to this, the printing conditions data management portion 262 stores a pattern name of the conditions pattern selected by the administrator in the field "printing conditions" of the record for the information processing apparatus 3 in the printing conditions setting table TB2 (see FIG. 8). Thereby, the setting of (limitations on) printing conditions for the information processing apparatus 3 is registered.

Further, the administrator can newly define a conditions pattern and set the defined conditions pattern for the information processing apparatus 3. In the case where a conditions pattern is newly defined, the administrator clicks the "add conditions" button in the printing conditions setting list screen HG1. Then, the dialogue display processing portion 271 displays a printing conditions setting screen HG3 as shown in FIG. 12A.

Here, the administrator enters a pattern name of the conditions pattern to be newly defined this time in a text box for the "printing conditions name". Further, the administrator sets respective limitations relating to items of a color, a printing surface and stapling. In the case where limitations relating to a color are set, the administrator clicks a pull down button corresponding thereto in the printing conditions setting screen HG3. In response to this, as shown in FIG. 12B, the dialogue display processing portion 271 displays options for limitations relating to a color in the form of pull down menu. The administrator clicks a most suitable option among the options. Limitations relating to a printing surface and a stapling can also be set in the same manner. Then, after the selection, the administrator clicks the "OK" button.

In response to this, the conditions pattern management portion 263 creates a record indicating the content entered or selected in the printing conditions setting screen HG3 and registers the created record in the printing conditions pattern table TB3.

In the case where an IP address of an information processing apparatus 3 is updated, the administrator selects a line for the information processing apparatus 3 from among the terminal-specific conditions list LT1 in the printing conditions setting list screen HG1 to click the "change information processing apparatus" button. Responsive to this, the dialogue display processing portion 271 calls a record for the information processing apparatus 3 from the printing conditions setting table TB2 (see FIG. 8), and displays the information processing apparatus setting screen HG2 (see FIG. 10) with a device name and the IP address of the information processing apparatus 3 written in advance.

Here, the administrator changes the IP address and clicks the "OK" button. Responsive to this, the printing conditions data management portion 262 updates the IP address of the record for the information processing apparatus 3 accordingly.

The administrator can also perform operation for changing printing conditions set in the information processing apparatus 3 and operation for changing the content of a conditions pattern set therein in the same manner as before.

As described above, the administrator operates the driver management apparatus 2 to perform operation for setting printing conditions. Instead, however, a configuration may be adopted in which the administrator operates the image forming apparatus 1 or the information processing apparatus 3 to perform operation for setting printing conditions. In such a case, it is preferable that the image forming apparatus 1 or the information processing apparatus 3 is made to display various types of screens using, for example, a known Common Gateway Interface (CGI) and a Web browser technology and the driver management apparatus 2 receives the content entered by the administrator.

When the administrator selects printing conditions for the information processing apparatus 3 and clicks the "OK" button in the printing conditions setting list screen HG1, the encryption key generating portion 272 and the terminal-specific driver generating portion 273 generate a driver to be given to the information processing apparatus 3 according to the following procedure.

The encryption key generating portion 272 creates an encryption key for the information processing apparatus 3 and a decryption key for decoding data encrypted by the encryption key. In this embodiment, the common key cryptography is used. Accordingly, an encryption key is also used as a decryption key. Hereinafter, a created encryption key is referred to as an "encryption key AK". Note that the encryption key generating portion 272 creates encryption keys AK different on an information processing apparatus 3 basis, in principle.

The terminal-specific driver generating portion 273 calls the driver of the image forming apparatus 1 from the fixed storage device 210 and copies the driver thus called. The terminal-specific driver generating portion 273 edits the copied driver so that a user can select printing conditions only within the range of the printing conditions that are set for the information processing apparatus 3. In short, the terminal-specific driver generating portion 273 places function limitations. The function limitations per se can be realized by a known method, as often seen in a so-called sample or shareware. For example, in some cases, the function limitations can be realized by editing a program for the driver. In other cases, the function limitations can be realized by changing a set value in the driver in line with printing conditions designated by an administrator.

In the case where, for example, printing conditions of "monochrome printing, single sided printing prohibited, stapling prohibited" are designated, a driver is so edited that none of options of color printing, duplex printing and stapling can be selected.

Then, the terminal-specific driver generating portion 273 incorporates an encryption key AK that is created by the encryption key generating portion 272 into the edited driver. With the processing described above, a driver for the information processing apparatus 3 can be generated.

Hereinafter, a generated driver is referred to as a "terminal-specific driver DR".

A generated terminal-specific driver DR is associated with identification information of the information processing apparatus 3, e.g., an IP address, a MAC address or a host name thereof, and saved and managed by the driver management portion 276. In addition, the driver transmission portion 274 sends the generated terminal-specific driver DR to the information processing apparatus 3. As described later, in the case where a request is made by an information processing apparatus 3, the driver transmission portion 274 sends the information processing apparatus 3 a terminal-specific driver DR for the information processing apparatus 3.

A created encryption key AK is associated with identification information of the information processing apparatus 3 and is saved and managed by the encryption key management portion 277. In addition, the encryption key transmission portion 275 sends the created encryption key AK to each of the image forming apparatuses 1 with the encryption key AK associated with the identification information of the information processing apparatus 3.

Referring to FIG. 6, when receiving the terminal-specific driver DR sent by the driver management apparatus 2, the driver receiving portion 372 of the information processing apparatus 3 installs the terminal-specific driver DR thus received on a hard disk drive of the information processing apparatus 3 itself as before.

In the case where, for example, the terminal-specific driver DR is deleted from the hard disk drive, the driver request portion 371 requests the terminal-specific driver DR of the information processing apparatus 3 itself from the driver management apparatus 2. When receiving the terminal-specific driver DR, the driver receiving portion 372 reinstalls the same on the hard disk drive of the information processing apparatus 3 itself.

Referring to FIG. 3, the encryption key receiving portion 171 of the image forming apparatus 1 receives the encryption key AK sent by the driver management apparatus 2. The encryption key management portion 172 saves and manages the encryption key AK thus received.

With the processing described above, preparation of an environment is completed in which a user operates an information processing apparatus 3 to cause an image forming apparatus 1 to perform PC print.

In the case where the same printing conditions are set for a plurality of information processing apparatuses 3, a terminal-specific driver DR and an encryption key AK for the information processing apparatuses 3 may be used in common.

In the case where printing conditions for an information processing apparatus 3 are changed, a new encryption key AK and a new terminal-specific driver DR are generated again and are sent to or saved in each portion of each apparatus in the same method described above. At this time, an old encryption key AK and an old terminal-specific driver DR are deleted.

[Processing at the Time of Execution of PC Print]

A user operates an information processing apparatus 3 as before, so that the user can cause a specific image forming apparatus 1 to print a document created with the information processing apparatus 3 or others. As described earlier, however, the user can select conditions concerning a color, a printing surface or the like only within the range of printing conditions that are set for the information processing apparatus 3.

When a user enters a print command for a specific image forming apparatus 1, i.e., a PC print command, a terminal-specific driver DR for an information processing apparatus 3 generates print data DT0 as before. In conventional systems, the print data DT0 is sent to the image forming apparatus 1 without being encrypted. In this embodiment, however, the print data DT0 is processed by each of the portions shown in FIG. 6 as described below.

The print data encryption processing portion 373 uses an encryption key AK incorporated into the terminal-specific driver DR given to the information processing apparatus 3 to encrypt the print data DT0.

The print request portion 374 sends the encrypted print data DT0 to the image forming apparatus 1 to request the image forming apparatus 1 to perform a printing process.

Referring to FIG. 3, the print request receiving portion 173 receives the encrypted print data DT0 from the information processing apparatus 3 to accept the print request.

The print data decoding processing portion 174 uses the encryption key AK of the information processing apparatus 3 as the request source to decode the print data DT0 received from the information processing apparatus 3.

The print data confirmation portion 175 makes sure that the print data DT0 could be decoded normally. For example, it is checked whether the first letter string in the print data DT0 subjected to the decoding processing is a predetermined character string, e.g., "%-12345X@PJL" of Universal Exit language (UEL) of PJL. Thereby, the print data confirmation portion 175 can confirm whether the print data DT0 could be decoded normally.

If the encryption key AK used for the encryption in the information processing apparatus 3 matches the encryption key AK used for decoding in the image forming apparatus 1, i.e., if both the encryption keys AK are identical to each other because the common key cryptography is used in this embodiment, then the print data DT0 is decoded normally. If both the encryption keys AK differ from each other, then the print data DT0 cannot be decoded normally.

The decoded data delivery portion 176 delivers the print data DT0 decoded normally to the printer controller 150 (see FIG. 2). After that, the printer controller 150 and the image output device 140 perform a printing process as before based on the print data DT0.

In the case where the print data DT0 could not be decoded normally, the printer controller 150 and the image output device 140 cannot perform a printing process.

Accordingly, for example, even if a certain information processing apparatus 3 requests an image forming apparatus 1 to perform a printing process using a terminal-specific driver DR that was given to other information processing apparatus 3 or a driver that was downloaded from a Web site of a manufacturer of the image forming apparatus 1, the image forming apparatus 1 attempts to decode print data DT0 using an encryption key AK corresponding to the information processing apparatus 3 as the request source. Therefore, the decoding is unsuccessful. Likewise, decoding is unsuccessful in the case where, after generating a terminal-specific driver DR again for an information processing apparatus 3, an old terminal-specific driver DR is used to request the image forming apparatus 1 to perform a printing process.

The following is a description, with reference to flowcharts, of the entire processing flows of the image forming apparatus 1, the driver management apparatus 2 and the information processing apparatus 3.

Figure 13:
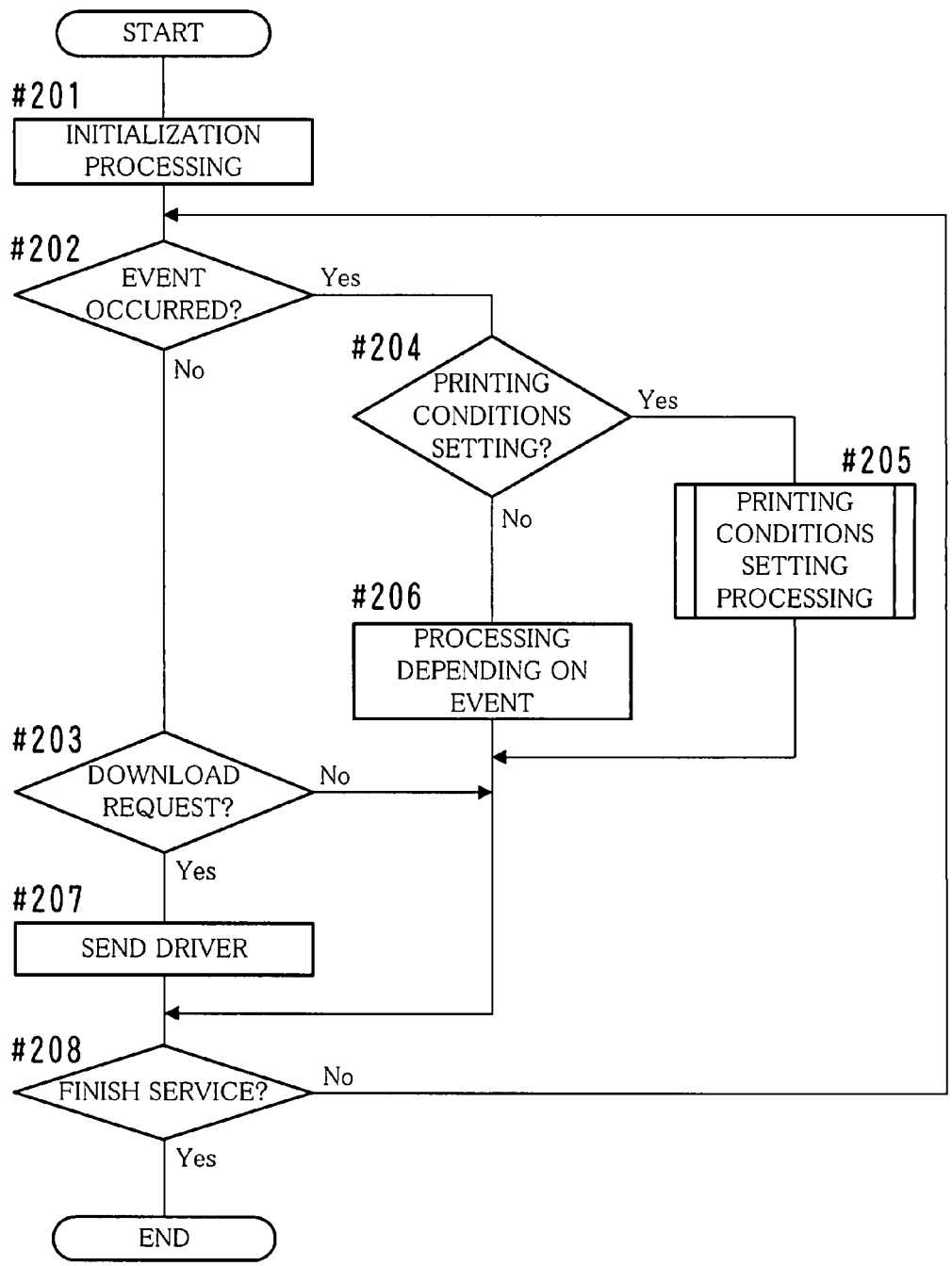
FIG. 13 is a flowchart showing an example of the entire processing flow in a driver management apparatus.

Referring to FIG. 13, when the driver management apparatus 2 is supplied with power or restarts, it performs general initialization processing such as clearing the S-RAM 203, setting a standard mode and starting an operating system as before (#201).

After completing the initialization processing, the driver management apparatus 2 constantly confirms whether some sort of an input event occurred in the input device 22 (a mouse or a keyboard) or whether a driver request was received from the information processing apparatus 3 (#202, #203).

In the case where an input event occurred (Yes in #202), if the event is related to setting of printing conditions (Yes in #204), then the driver management apparatus 2 performs processing for setting the printing conditions (#205). The processing procedure is as shown in FIG. 14.

Figure 14:
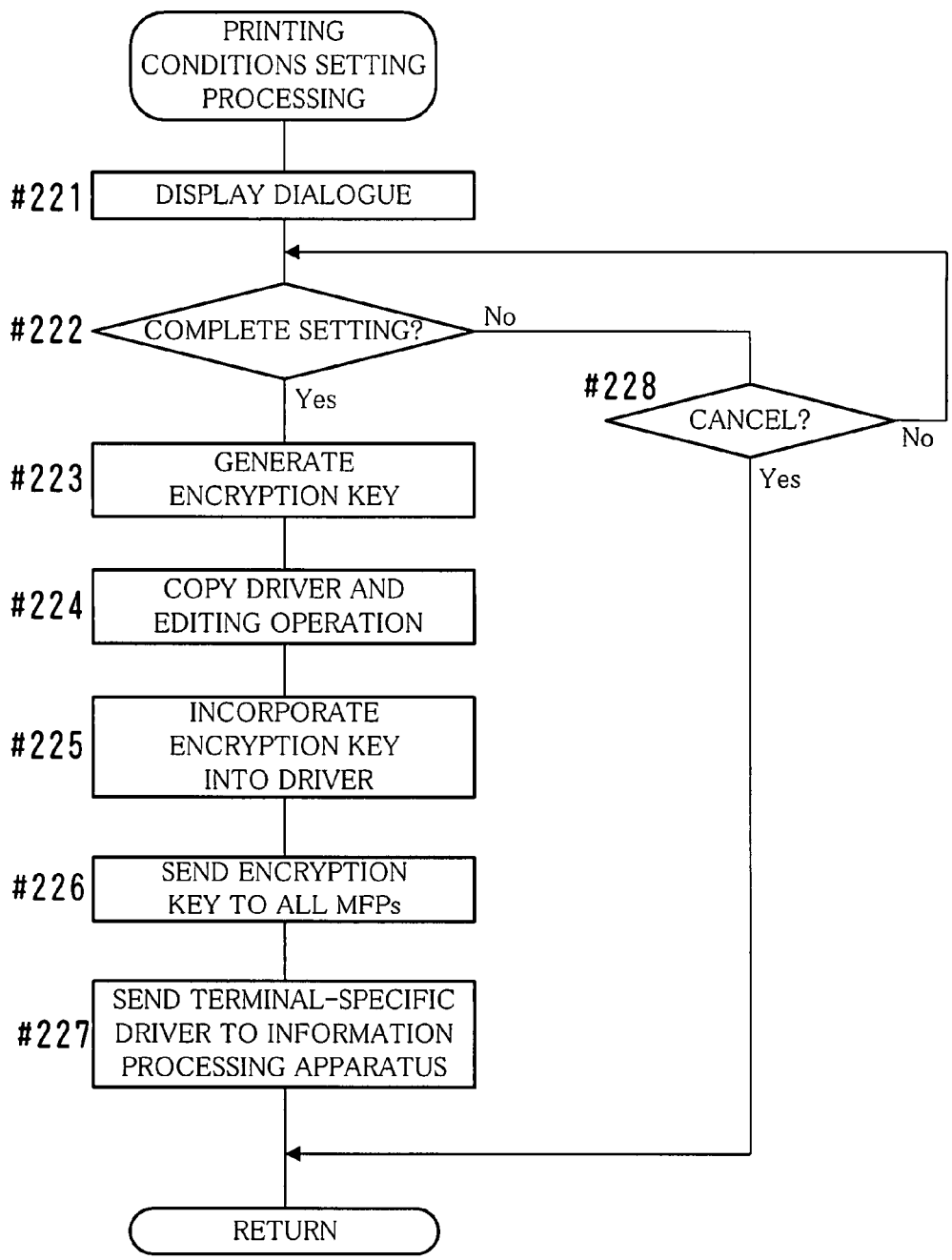
FIG. 14 is a flowchart showing an example of a flow of printing conditions setting processing.

Referring to FIG. 14, the driver management apparatus 2 displays a dialogue in accordance with operation performed by an administrator (#221). If the administrator performs setting of printing conditions for the information processing apparatus 3 or changes the content of prior printing conditions (Yes in #222), then the driver management apparatus 2 newly generates an encryption key AK (#223), copies a driver of the image forming apparatus 1, and reflects in the copied driver the printing conditions that were set or changed by the administrator (#224). The driver management apparatus 2 incorporates the encryption key AK into the driver, so that a terminal-specific driver DR is generated (#225).

The driver management apparatus 2 associates the generated encryption key AK with identification information of the information processing apparatus 3 to send the same to all the image forming apparatuses 1 (#226). Then, the driver management apparatus 2 sends the generated terminal-specific driver DR to the information processing apparatus 3 (#227). In the case where a terminal-specific driver DR common to a plurality of information processing apparatuses 3 is generated, the driver management apparatus 2 sends the terminal-specific driver DR to each of the information processing apparatuses 3.

If the administrator clicks the cancel button before completion of the setting or the change (Yes in #228), the driver management apparatus 2 stops the processing without generating a terminal-specific driver DR.

Referring back to FIG. 13, in the case where the event thus occurred is related to matters other than the printing conditions (No in #204), the driver management apparatus 2 performs processing depending on the event as before (#206).

In the case where the driver management apparatus 2 receives a request for a terminal-specific driver DR from the information processing apparatus 3 (No in #202, Yes in #203), the driver management apparatus 2 sends a terminal-specific driver DR corresponding to the information processing apparatus 3 to the information processing apparatus 3 (#207).

The driver management apparatus 2 performs the processing from Step #202 through Step #207 appropriately until it finishes the service.

Figure 15:
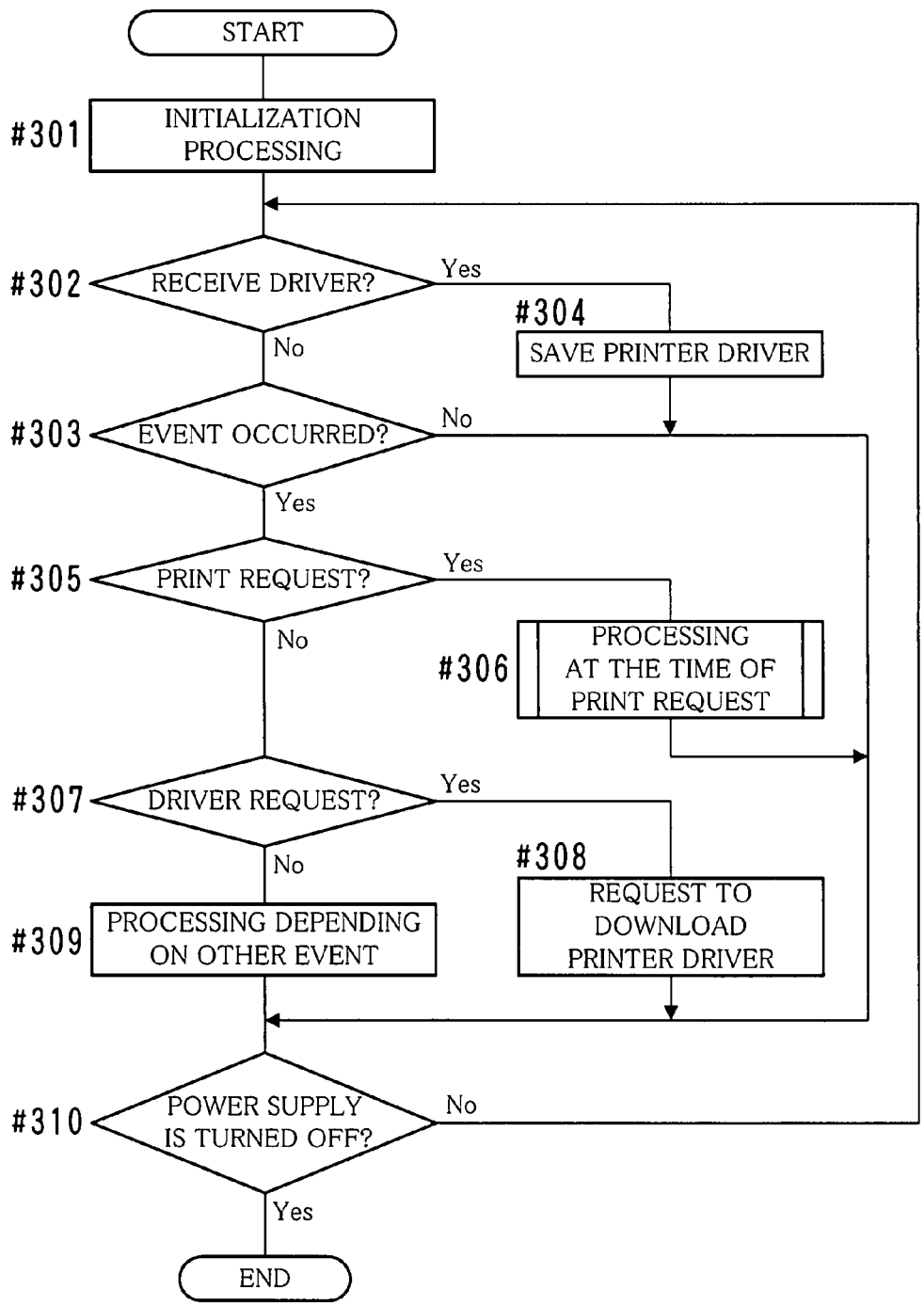
FIG. 15 is a flowchart showing an example of the entire processing flow in an information processing apparatus.

Referring to FIG. 15, when the information processing apparatus 3 is supplied with power or restarts, it performs general initialization processing such as clearing an S-RAM, setting a standard mode and starting an operating system as before (#301).

After completing the initialization processing, the information processing apparatus 3 constantly confirms whether a terminal-specific driver DR was received from the driver management apparatus 2, or whether some sort of an input event occurred in a keyboard or a mouse (#302, #303).

In the case where the information processing apparatus 3 received a terminal-specific driver DR (Yes in #302), it installs the same (#304). In the case where a new terminal-specific driver DR was received, i.e., a request was made to change the driver, the information processing apparatus 3 deletes an old terminal-specific driver DR and newly installs this new terminal-specific driver DR (#304). In short, the information processing apparatus 3 performs overwrite operation.

In the case where an input event occurred (Yes in #303), if the event is related to a PC print request (Yes in #305), then the information processing apparatus 3 performs processing for requesting the image forming apparatus 1 selected by a user to execute a print job (#306). This processing procedure is as shown in FIG. 16.

Figure 16:
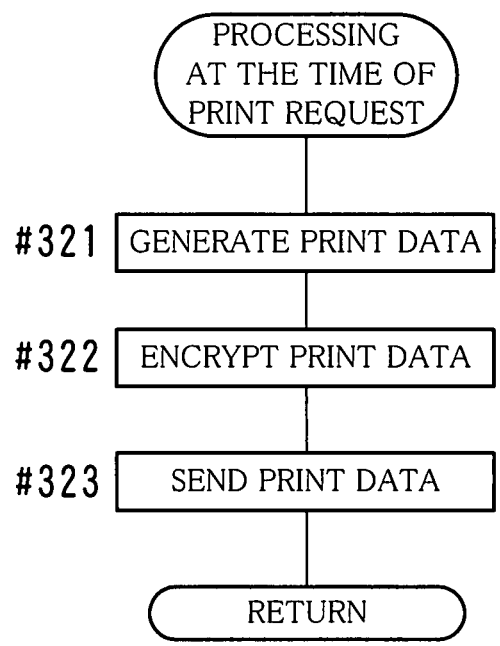
FIG. 16 is a flowchart showing an example of a processing flow when a print request is made.

Referring to FIG. 16, the information processing apparatus 3 uses a terminal-specific driver DR installed on the information processing apparatus 3 itself to generate print data DT0 for a document to be printed (#321). The information processing apparatus 3 encrypts the generated print data DT0 using an encryption key AK incorporated into the terminal-specific driver DR (#322). Then, the information processing apparatus 3 sends the encrypted print data DT0 to the image forming apparatus 1 selected by the user, so that a print request is made (#323).

Referring back to FIG. 15, in the case where the event thus occurred is related to a request to download a terminal-specific driver DR (No in #305, Yes in #307), the information processing apparatus 3 requests the driver management apparatus 2 to send a terminal-specific driver DR (#308).

In the case where the event thus occurred is not a PC print request or a request to download a terminal-specific driver DR (No in #305, No in #307), the information processing apparatus 3 performs processing depending on the event as before (#309).

The information processing apparatus 3 performs the processing from Step #302 through Step #309 appropriately until it is turned OFF or restarts.

Figure 17:
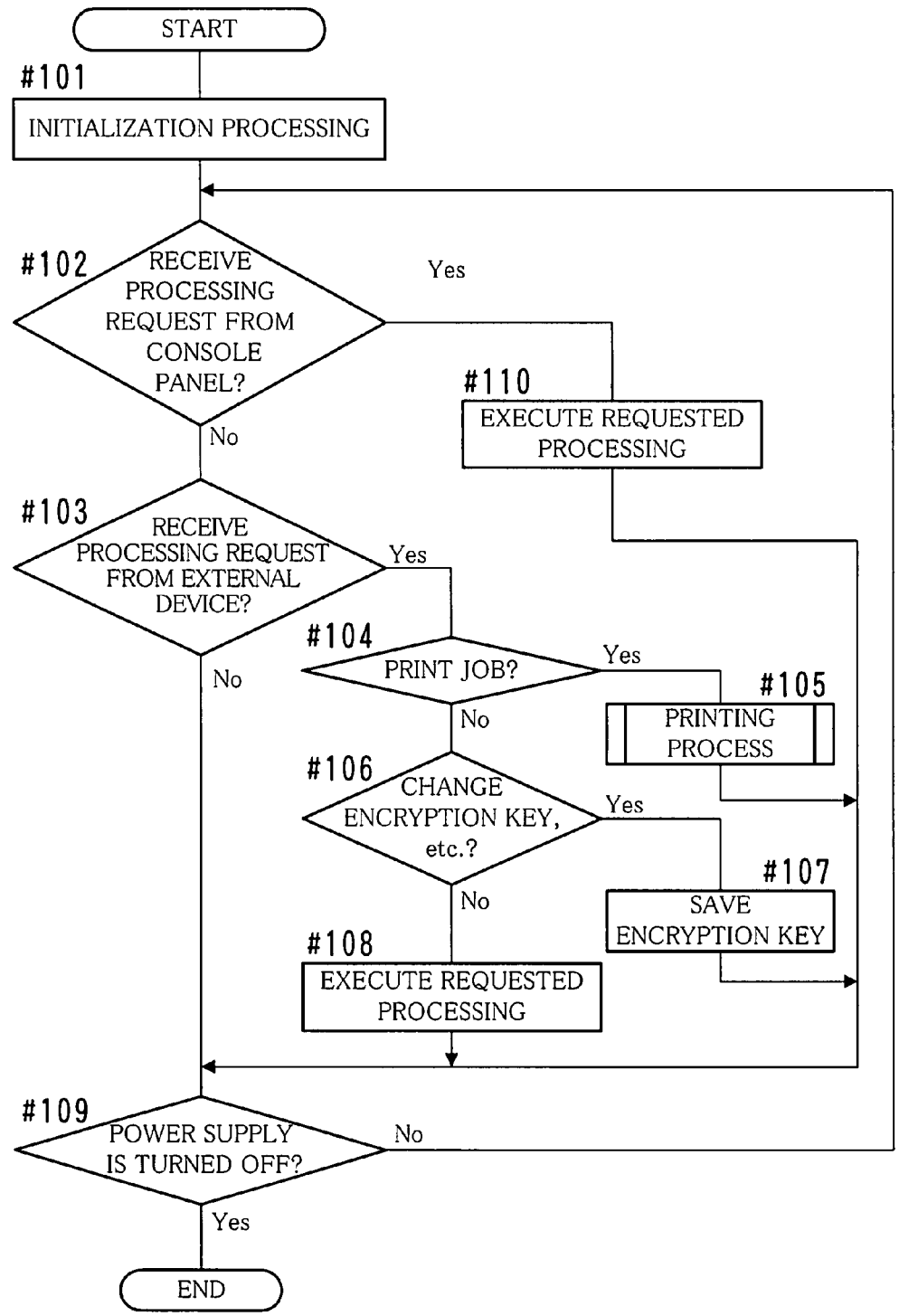
FIG. 17 is a flowchart showing an example of the entire processing flow in an image forming apparatus.

Referring to FIG. 17, when the image forming apparatus 1 is supplied with power or restarts, it performs general initialization processing such as clearing the S-RAM 103, setting a standard mode and starting an operating system as before (#101).

After completing the initialization processing, the image forming apparatus 1 constantly confirms whether a user operated a key switch group such as a numeric keypad or a touch panel of the console panel 130, or whether some sort of a request is made by other apparatus (#102, #103).

In the case where operation performed by the user was detected (Yes in #102), the image forming apparatus 1 performs processing as before in accordance with the operation, i.e., in response to a request made by the user (#110). For example, the image forming apparatus 1 performs processing such as scanning of an original, copying, FAX transmission, or change of various settings stored in the NV-RAM 104.

In the case where a certain request was made by other apparatus (Yes in #103), if the request is related to execution of a PC print job (Yes in #104), then the image forming apparatus 1 performs a printing process (#105). The processing procedure is as shown in FIG. 18.

Figure 18:
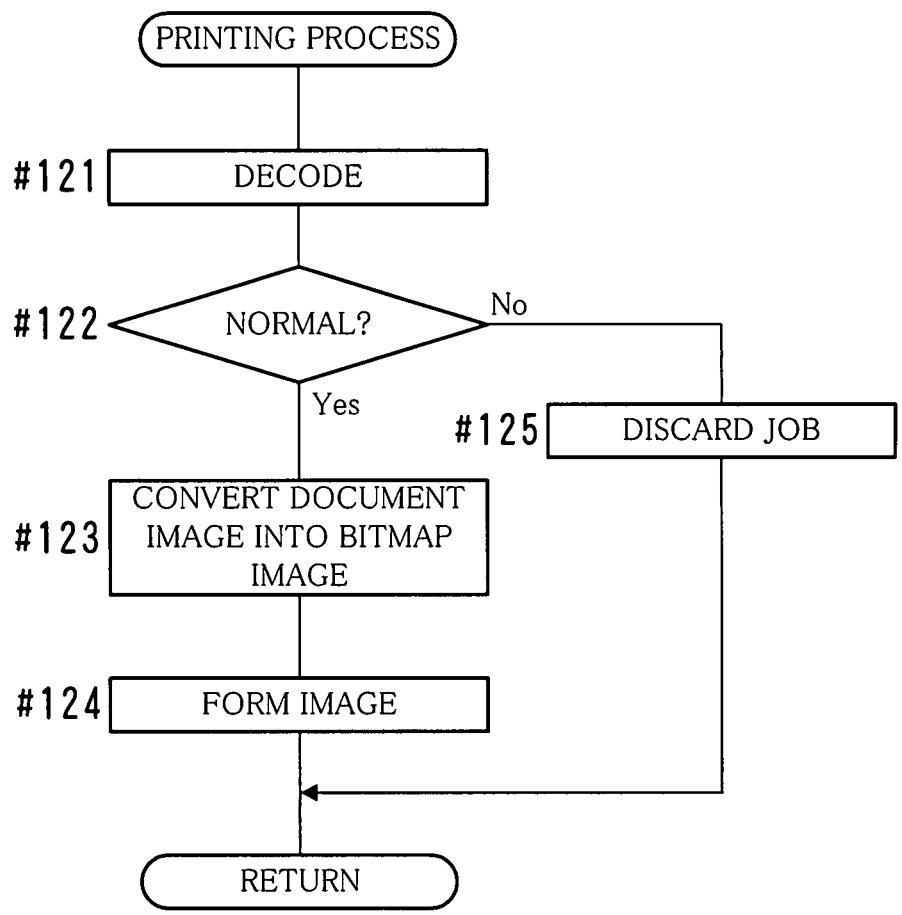
FIG. 18 is a flowchart showing an example of a flow of a printing process.

Referring to FIG. 18, the image forming apparatus 1 decodes the print data DT0 received from the information processing apparatus 3 at the time of requesting the PC print, using the encryption key AK of the information processing apparatus 3 (#121).

In the case where the print data DT0 could be decoded normally (Yes in #122), the image forming apparatus 1 uses the decoded print data DT0 to convert a document image into a bitmap image (#123) and prints the bitmap image on a sheet of paper (#124).

In the case where the print data DT0 could not be decoded normally (No in #122), the image forming apparatus 1 discards a job relating to this request (#125).

Referring back to FIG. 17, in the case where a request from other apparatus is related to the save of an encryption key AK of a specific information processing apparatus 3 (No in #104, Yes in #106), the image forming apparatus 1 saves the encryption key AK sent from the driver management apparatus 2 (#107). In the case where the encryption key AK of the information processing apparatus 3 is already saved, the image forming apparatus 1 discards the already-saved encryption key AK and newly saves the encryption key AK sent this time (#107). In short, the image forming apparatus 1 switches the encryption keys AK.

In the case where a request made by other apparatus is neither related to execution of a PC print job nor to the save of the encryption key AK (No in #104, No in #106), the image forming apparatus 1 performs processing relating to the request as before (#108). For example, the image forming apparatus 1 performs processing for changing various settings stored in the NV-RAM 104.

The image forming apparatus 1 performs the processing from Step #102 through Step #108 appropriately until the image forming apparatus 1 is turned OFF or restarts.

In this embodiment, a terminal-specific driver DR in which authorization for use is reflected is distributed to each information processing apparatus 3 that uses a PC print service provided by the image forming apparatus 1. Unless an information processing apparatus 3 uses an encryption key AK incorporated in a terminal-specific driver DR to encrypt print data DT0 and sends the encrypted print data DT0 to the image forming apparatus 1, the information processing apparatus 3 cannot use a PC print service.

Thus, compared to conventional systems, this embodiment makes it possible to certainly place, for each of the information processing apparatuses 3, limitations on the use of a PC print service provided by the image forming apparatus 1.

In this embodiment, the description is provided of the case in which the common key cryptography is adopted. Instead, however, the public key cryptography can be adopted.

In such a case, the driver management apparatus 2 gives the information processing apparatus 3 a terminal-specific driver DR into which a secret key HK is incorporated instead of an encryption key AK. Further, the driver management apparatus 2 gives the image forming apparatus 1 a public key PK that makes a pair with the secret key HK, instead of an encryption key AK.

The information processing apparatus 3 uses the secret key HK incorporated into the terminal-specific driver DR to encrypt print data DT0 and sends the encrypted print data DT0 to the image forming apparatus 1. Then, the image forming apparatus 1 decodes the print data DT0 received from the information processing apparatus 3 using the public key PK for the information processing apparatus 3 and performs a printing process. Alternatively, the public key PK may be incorporated into the terminal-specific driver DR and the secret key HK corresponding to the public key PK may be distributed to the image forming apparatus 1.

The encryption key AK may be changed also in the case where no printing conditions are changed. In such a case, the existing terminal-specific driver DR into which the encryption key AK is incorporated is generated again and the terminal-specific driver DR thus generated is given to the information processing apparatus 3 again. In addition, the encryption key AK is distributed to the image forming apparatus 1 again.

The information processing apparatus 3 may encrypt only specific part of print data DT0 instead of encrypting the entire print data DT0.

Second Embodiment

In the first embodiment, the information processing apparatus 3 encrypts print data DT0 and sends the encrypted print data DT0 to the image forming apparatus 1. The image forming apparatus 1 performs a printing process in the case where the print data DT0 could be decoded normally. Stated differently, the image forming apparatus 1 determines the validity of the print request source by the decoding result of the print data DT0.

In the second embodiment, an identifier (ID) issued on an information processing apparatus 3 basis is used to determine the validity of the print request source.

The entire configuration of the image processing system GSS according to the second embodiment is the same as that of the first embodiment and is as shown in FIG. 1. The hardware configuration of each of the image forming apparatus 1, the driver management apparatus 2 and the information processing apparatus 3 is the same as those in the first embodiment.

Figure 19:
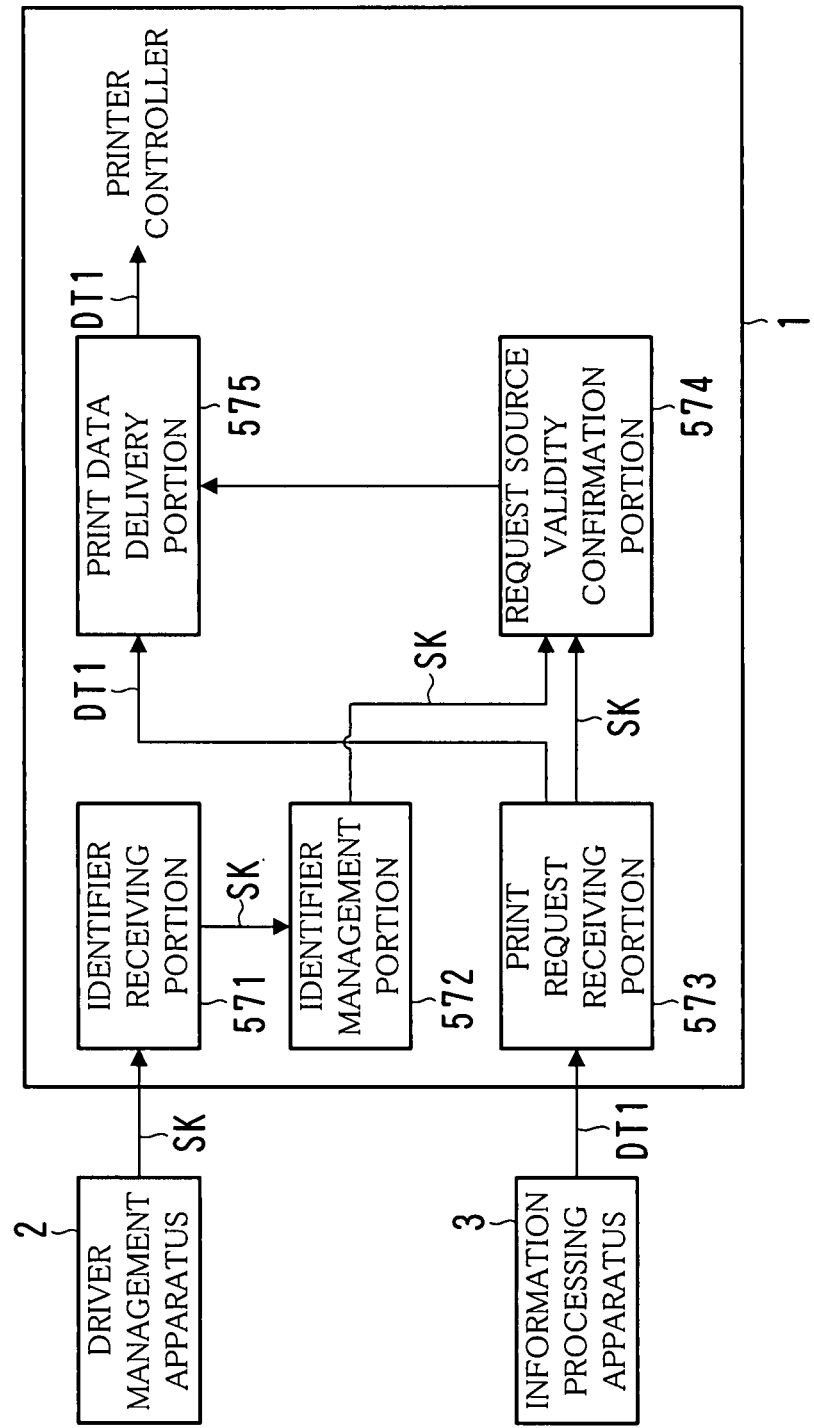
FIG. 19 is a diagram showing a modified example of a functional configuration of an image forming apparatus.

In the second embodiment, however, on the fixed storage device 110 of the image forming apparatus 1 is stored a control program, instead of the control program for achieving the functions as shown in FIG. 3, for achieving functions including an identifier receiving portion 571, an identifier management portion 572, a print request receiving portion 573, a request source validity confirmation portion 574 and a print data delivery portion 575, all of which are shown in FIG. 19.

Figure 20:
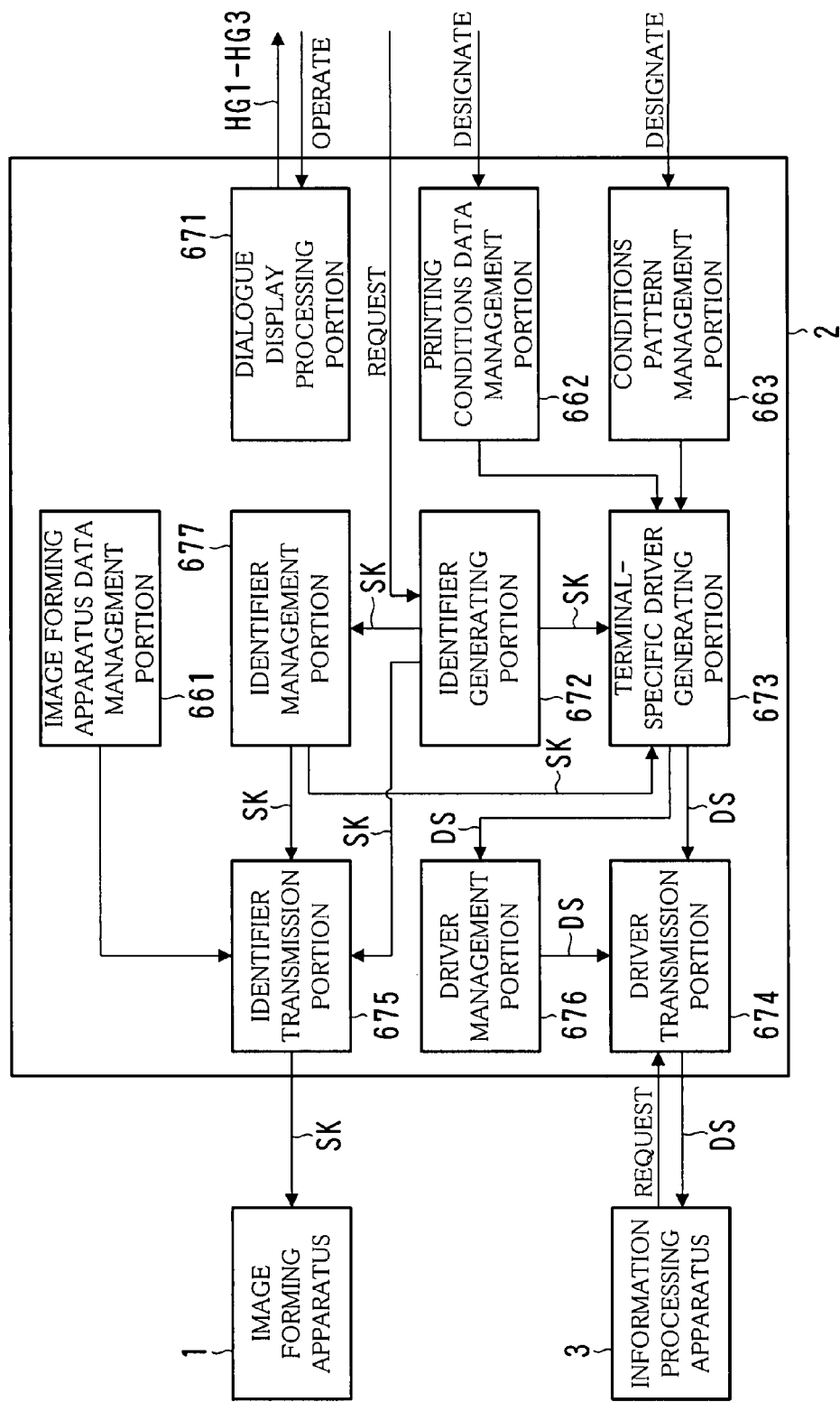
FIG. 20 is a diagram showing a modified example of a functional configuration of a driver management apparatus.

On the fixed storage device 210 of the driver management apparatus 2 is stored a control program, instead of the control program for achieving the functions as shown in FIG. 5, for achieving functions including an image forming apparatus data management portion 661, a printing conditions data management portion 662, a conditions pattern management portion 663, a dialogue display processing portion 671, an identifier generating portion 672, a terminal-specific driver generating portion 673, a driver transmission portion 674, an identifier transmission portion 675, a driver management portion 676 and an identifier management portion 677, all of which are shown in FIG. 20.

Figure 21:
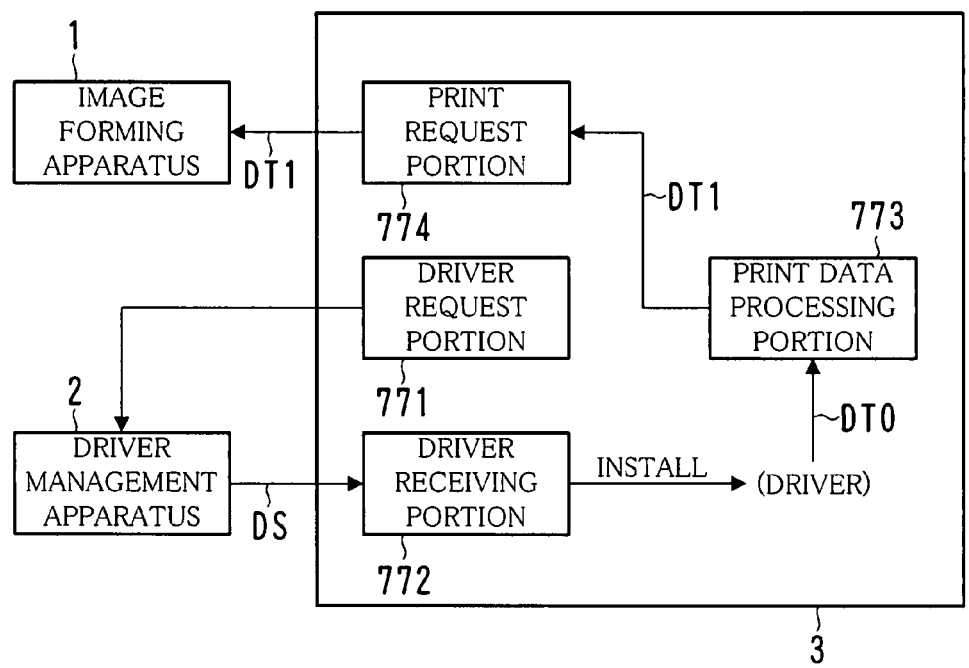
FIG. 21 is a diagram showing a modified example of a functional configuration of an information processing apparatus.

On the hard disk drive of the information processing apparatus 3 is stored a control program, instead of the control program as shown in FIG. 6, for achieving functions including a driver request portion 771, a driver receiving portion 772, a print data processing portion 773 and a print request portion 774 that are shown in FIG. 21.

The following is a description of the processing content of each of the portions included in the image forming apparatus 1 shown in FIG. 19, of each of the portions included in the driver management apparatus 2 shown in FIG. 20, and of each of the portions included in the information processing apparatus 3 shown in FIG. 21. In the description, the processing content is broadly divided into processing for preparing an environment where PC print is performed, and processing at the time of the execution of the PC print. However, a description of points that are shared with the first embodiment is omitted.

[Processing for Preparing Environment Where PC Print is Performed]

Referring to FIG. 20, the image forming apparatus data management portion 661 of the driver management apparatus 2 includes the image forming apparatus management table TB1 as shown in FIG. 7 and manages data on each of the image forming apparatuses 1 installed in the image processing system GSS, as with the image forming apparatus data management portion 261 in the first embodiment as shown in FIG. 5.

The printing conditions data management portion 662 includes the printing conditions setting table TB2 as shown in FIG. 8 and manages data on printing conditions that are set for each of the information processing apparatuses 3, as with the printing conditions data management portion 262 in the first embodiment.

The conditions pattern management portion 663 includes the printing conditions pattern table TB3 as shown in FIG. 11 and manages conditions patterns, as with the conditions pattern management portion 263 in the first embodiment.

The dialogue display processing portion 671 performs processing for displaying on the display 21 dialogue boxes as shown in FIGS. 9, 10 and 12 for an administrator to enter limitations on printing conditions for each information processing apparatus 3, as with the dialogue display processing portion 271 in the first embodiment. In addition, the procedure of operation performed by an administrator and processing content of each of the portions in accordance with the operation procedure are basically the same as those of the first embodiment.

An administrator selects printing conditions for the information processing apparatus 3 and clicks the "OK" button in the printing conditions setting list screen HG1 (see FIG. 9). Responding to this, the identifier generating portion 672 and the terminal-specific driver generating portion 673 generate a driver to be given to the information processing apparatus 3 according to the following procedure.

The identifier generating portion 672 generates a first identifier for the information processing apparatus 3 and a second identifier corresponding to the first identifier. In this embodiment, a case is described in which a common (the same) identifier is used as the first identifier and the second identifier corresponding thereto. Hereinafter, a generated identifier is referred to as an "identifier SK". Note that the identifier generating portion 672 generates identifiers SK different on an information processing apparatus 3 basis in principle.

The terminal-specific driver generating portion 673 calls a driver of the image forming apparatus 1 from the fixed storage device 210 and copies the driver thus called. Editing operation is performed on the copied driver so that a user can select printing conditions only within the range of printing conditions that are set for the information processing apparatus 3. In short, function limitations are placed.

Then, the terminal-specific driver generating portion 673 incorporates the identifier SK generated by the identifier generating portion 672 into the driver subjected to the editing operation. With the processing described above, a driver for the information processing apparatus 3 is generated. Hereinafter, a generated driver is referred to as a "terminal-specific driver DS".

The generated terminal-specific driver DS is associated with identification information of the information processing apparatus 3 and saved and managed by the driver management portion 676. Further, the generated terminal-specific driver DS is sent to the information processing apparatus 3 by the driver transmission portion 674. Note that, also in the case where a request is made by an information processing apparatus 3, the driver transmission portion 674 sends to the information processing apparatus 3 a terminal-specific driver DS for the information processing apparatus 3, as with the case of the first embodiment.

The generated identifier SK is associated with the identification information of the information processing apparatus 3 and is saved and managed by the identifier management portion 677. In addition; the identifier transmission portion 675 associates the generated identifier SK with the identification information of the information processing apparatus 3 and sends the identifier SK to each of the image forming apparatuses 1.

Referring to FIG. 21, when the driver receiving portion 772 of the information processing apparatus 3 receives the terminal-specific driver DS sent from the driver management apparatus 2, it installs the same onto the hard disk drive of the information processing apparatus 3 itself, as with the driver receiving portion 372 shown in FIG. 6 in the first embodiment.

The driver request portion 771 requests the terminal-specific driver DS of the information processing apparatus 3 itself from the driver management apparatus 2 as with the driver request portion 371 in the first embodiment.

Referring to FIG. 19, the identifier receiving portion 571 of the image forming apparatus 1 receives the identifier SK sent from the driver management apparatus 2. The identifier management portion 572 saves and manages the identifier SK thus received.

With the processing described above, preparation of an environment is completed in which a user operates an information processing apparatus 3 to cause an image forming apparatus 1 to perform PC print.

In the case where the same printing conditions are set for a plurality of information processing apparatuses 3, a terminal-specific driver DR and an identifier SK for the information processing apparatuses 3 may be used in common.

In the case where printing conditions for an information processing apparatus 3 are changed, a new identifier SK and a new terminal-specific driver DS are generated again with the same method as described above and are sent to or saved in each portion of each apparatus. At this time, an old identifier SK and an old terminal-specific driver DR are deleted.

[Processing at the Time of Execution of PC Print]

When a user enters a print command for a specific image forming apparatus 1, i.e., a PC print command, a terminal-specific driver DS of an information processing apparatus 3 generates print data DT0 as before.

Referring to FIG. 21, the print data processing portion 773 of the information processing apparatus 3 adds to the generated print data DT0 an identifier SK incorporated into the terminal-specific driver DS given to the information processing apparatus 3 itself. Hereinafter, print data DT0 to which the identifier SK is added is referred to as "print data DT1".

The print request portion 774 sends the print data DT1 to an image forming apparatus 1 that is caused to perform a printing process and thereby requests the image forming apparatus 1 to perform the printing process.

Referring to FIG. 19, the print request receiving portion 573 receives the print data DT1 from the information processing apparatus 3 and thereby accepts a print request.

The request source validity confirmation portion 574 compares the identifier SK added to the print data DT1 received from the information processing apparatus 3 with the identifier SK of the information processing apparatus 3 that is managed by the identifier management portion 572. Thereby, the request source validity confirmation portion 574 confirms whether the information processing apparatus 3 performed a print request using a terminal-specific driver DS of the information processing apparatus 3 itself, i.e., a normal terminal-specific driver DS. If both the identifiers SK match each other, then, it is determined that the print request was made using the normal terminal-specific driver DS. If both the identifiers SK do not match each other, it is determined that the normal terminal-specific driver DS is not used.

The print data delivery portion 575 delivers the print data DT1 to the printer controller 150 (see FIG. 2) only in the case where the request source validity confirmation portion 574 confirms that a print request was made using the normal terminal-specific driver DS. After that, the printer controller 150 and the image output device 140 perform a printing process, as before, based on the print data DT1.

In the second embodiment, the entire processing flows of the image forming apparatus 1, the driver management apparatus 2 and the information processing apparatus 3 are basically the same as those of the first embodiment and are as shown in FIGS. 17, 13 and 15 respectively.

Figure 22:
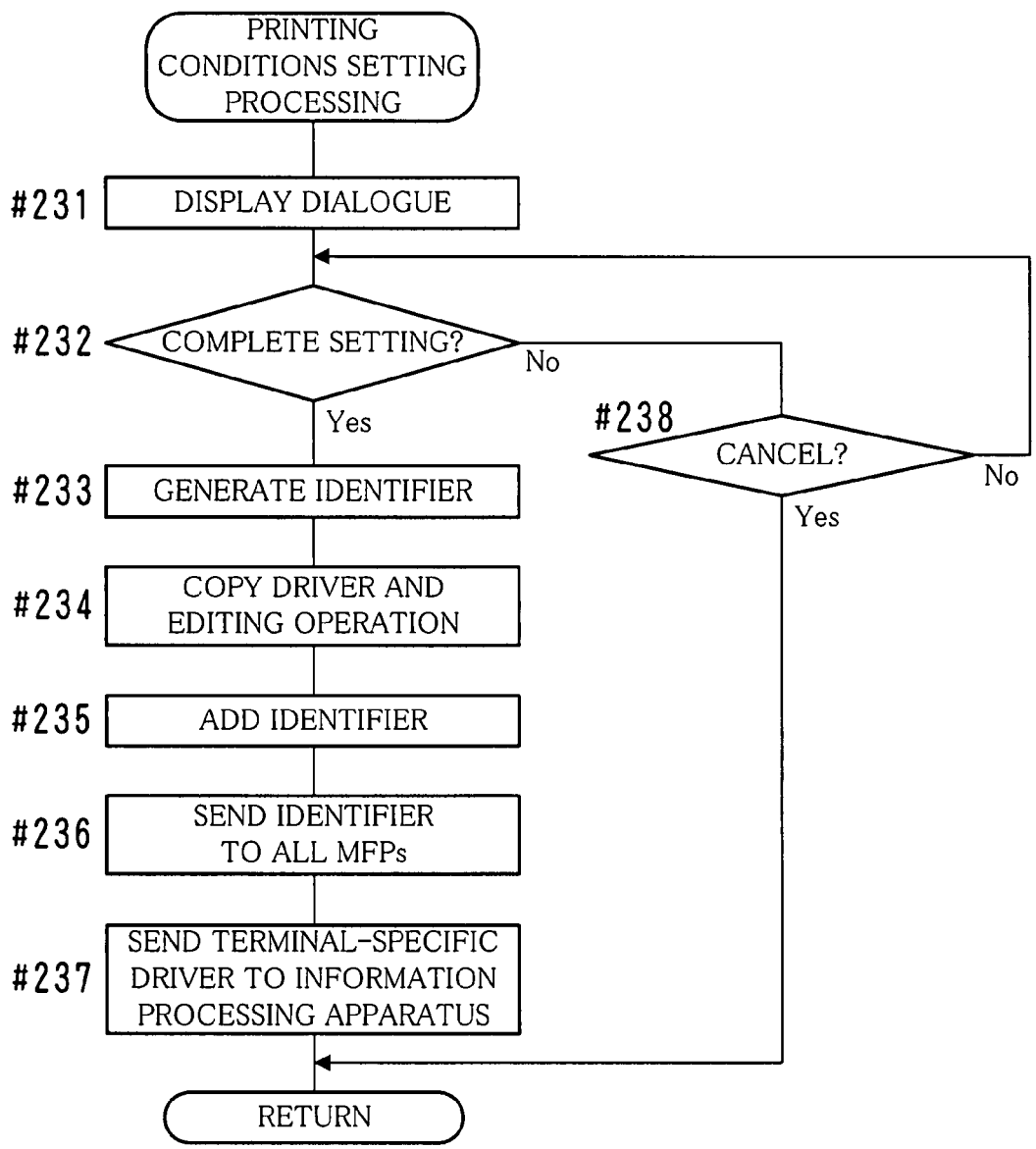
FIG. 22 is a flowchart showing a modified example of a printing conditions setting flow.

The driver management apparatus 2 performs processing for setting printing conditions in Step #205 shown in FIG. 13 according to the procedure shown in FIG. 22.

When an administrator completes the setting of printing conditions for the information processing apparatus 3 (Yes in #232 in FIG. 22), the driver management apparatus 2 newly generates an identifier SK for the information processing apparatus 3 (#233), copies a driver of the image forming apparatus 1 and reflects the printing conditions in the copied driver (#234). The identifier SK is incorporated into the driver, so that a terminal-specific driver DS is generated (#235).

The driver management apparatus 2 associates the generated identifier SK with identification information of the information processing apparatus 3 and sends the identifier SK to all the image forming apparatuses 1 (#236). The driver management apparatus 2 also sends the generated terminal-specific driver DS to the information processing apparatus 3 (#237).

Figure 23:
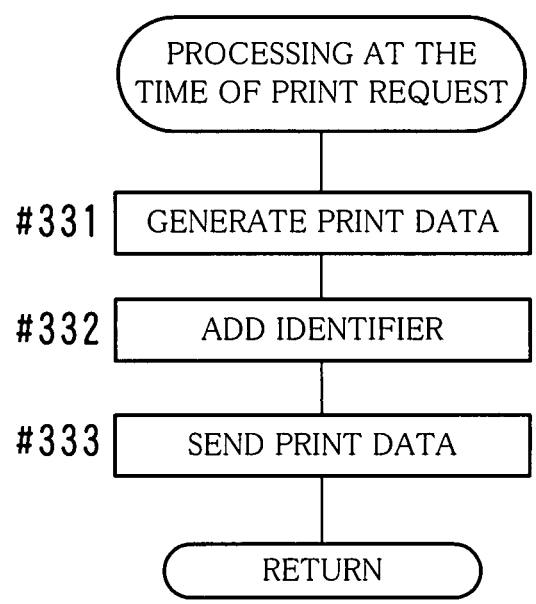
FIG. 23 is a flowchart showing a modified example of a processing flow when a print request is made.

Further, in the second embodiment, the information processing apparatus 3 performs processing at the time of making a print request in Step #306 in FIG. 15 according to the procedure shown in FIG. 23.

The information processing apparatus 3 uses the terminal-specific driver DS installed in the information processing apparatus 3 itself to generate print data DT0 for a document to be printed (#331 in FIG. 23). The information processing apparatus 3 adds to the generated print data DT0 an identifier SK incorporated into the terminal-specific driver DS and thereby generates print data DT1 (#332). Then, the information processing apparatus 3 sends the print data DT1 to an image forming apparatus 1 selected by a user, so that a print request is made (#333).

Figure 24:
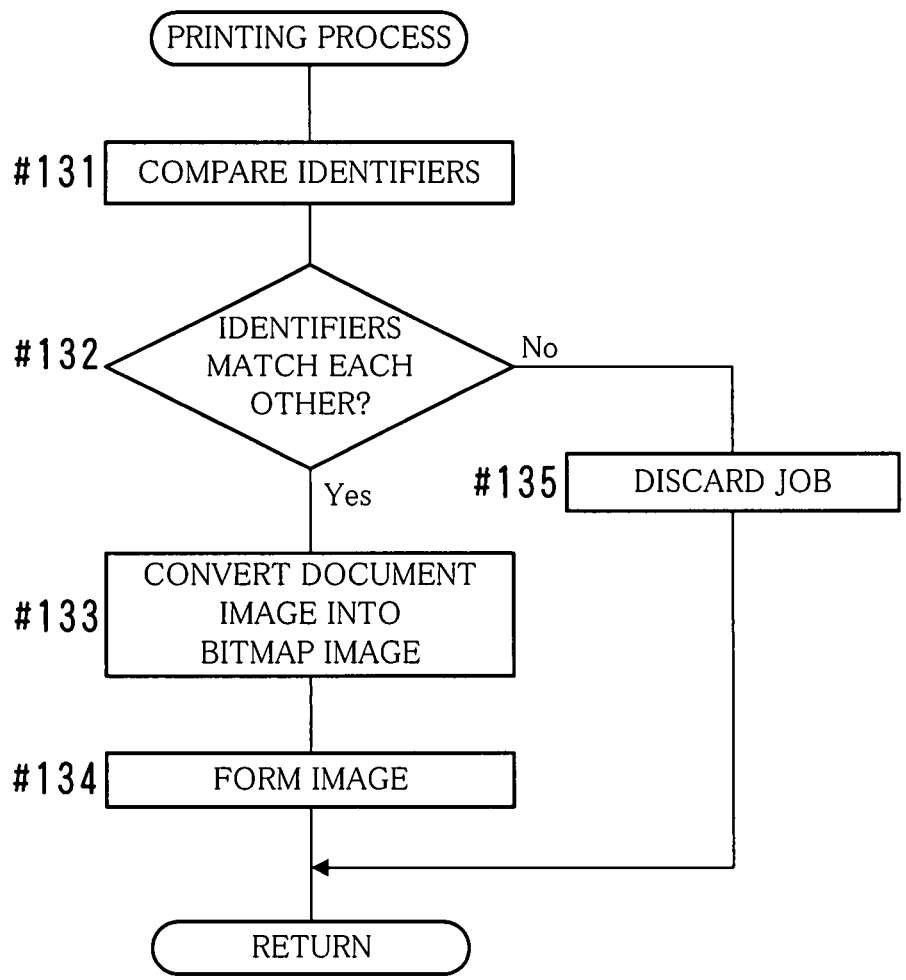
FIG. 24 is a flowchart showing a modified example of a printing process.

Moreover, in the second embodiment, the image forming apparatus 1 performs a printing process in Step #105 in FIG. 17 according to the procedure shown in FIG. 24.

The image forming apparatus 1 compares the identifier SK added to the print data DT1 that was received from the information processing apparatus 3 at the time of making a PC print request with the identifier SK saved in the information processing apparatus 3, and thereby to confirm the validity of the information processing apparatus 3 (#131 in FIG. 24).

If it can be confirmed that both the identifiers SK match each other and the information processing apparatus 3 is valid (Yes in #132), then the image forming apparatus 1 uses the print data DT1 to convert the document image into a bitmap image (#133), and prints the same on a sheet of paper (#134). If both the identifiers SK do not match each other (No in #132), then the image forming apparatus 1 discards a job relating to this request (#135).

Further, in the case where an identifier SK of the information processing apparatus 3 is sent from the driver management apparatus 2, the image forming apparatus 1 saves the same in Step #107 in FIG. 17; In the case where an identifier SK of the information processing apparatus 3 is already saved, the image forming apparatus 1 deletes the already-saved identifier SK and newly saves the identifier SK that has been sent this time.

In this embodiment, a terminal-specific driver DS in which authorization for use is reflected is distributed to each information processing apparatus 3 that uses a PC print service provided by the image forming apparatus 1. Unless an information processing apparatus 3 sends to the image forming apparatus 1 the print data DT0 with an identifier SK that is incorporated into the terminal-specific driver DS added, the information processing apparatus 3 cannot use the PC print service.

Thus, compared to conventional systems, this embodiment makes it possible to certainly place, for each of the information processing apparatuses 3, limitations on the use of a PC print service provided by the image forming apparatus 1.

In this embodiment, a letter string of an identifier SK to be incorporated into a terminal-specific driver DS given to an information processing apparatus 3 is equal to a letter string of an identifier SK, corresponding to the information processing apparatus 3, to be distributed to an image forming apparatus 1. Instead, however, both the letter strings can be different from each other.

For example, suppose that an identifier to be incorporated into a terminal-specific driver DS given to an information processing apparatus 3 is denoted by a first identifier SK1. A second identifier SK2 that is determined by substituting the first identifier SK1 in place of a predetermined hash function $F(x)$ is distributed to an image forming apparatus 1.

The information processing apparatus 3 sends the print data DT0 to the image forming apparatus 1 with the first identifier SK1 of the information processing apparatus 3 added. The image forming apparatus 1 compares an identifier that is determined by substituting the first identifier SK1 added to the print data DT0 received from the information processing apparatus 3 in place of a predetermined hash function $F(x)$ with the second identifier SK2 of the information processing apparatus 3. Only in the case where both the identifiers match each other, the validity of the information processing apparatus 3 is recognized and a printing process is performed based on the print data DT0.

Figure 25:
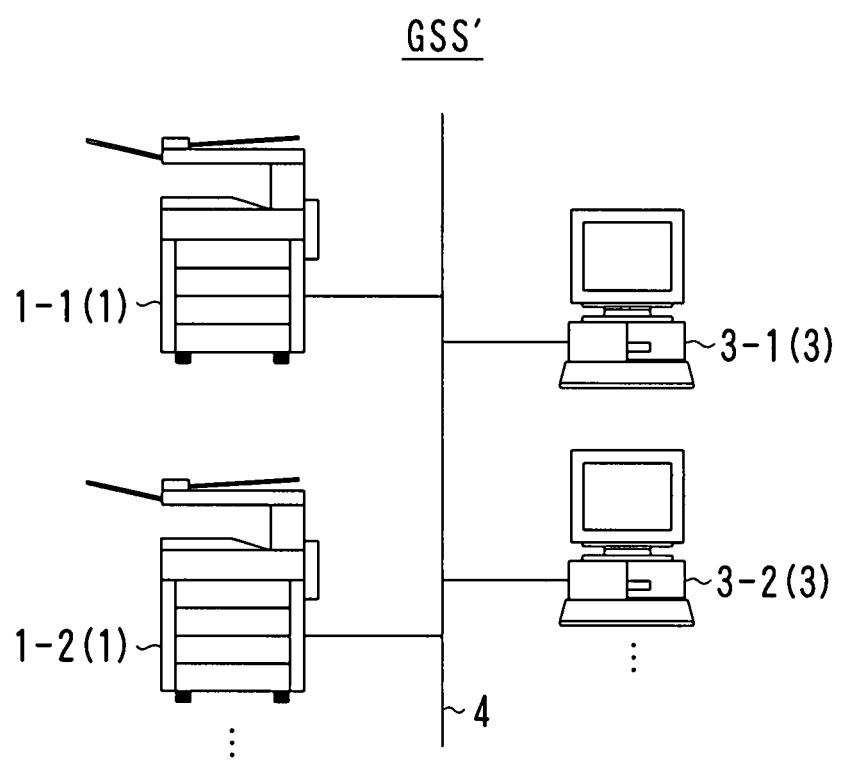
FIG. 25 is a diagram showing a modified example of the entire configuration of an image processing system.

In the first and second embodiments, the driver management apparatus 2 generates a terminal specific-driver DR or DS, an encryption key AK and an identifier SK. Instead, however, a configuration may be adopted in which the image forming apparatus 1 generates them. In such a case, as shown in FIG. 25, the image processing system GSS can be configured by image forming apparatuses 1, information processing apparatuses 3 and a communication line 4.

Then, the image forming apparatus 1 may be provided with functions of the portions shown in FIG. 5 or functions of the portions shown in FIG. 20. The information processing apparatus 3 may be given a terminal-specific driver DR or DS from the image forming apparatus 1.

Figure 26:
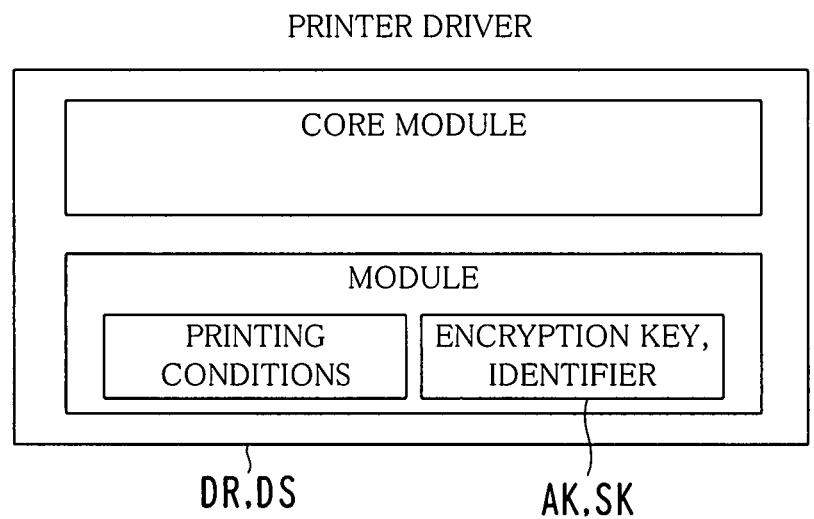
FIG. 26 shows an example of a way of incorporating an encryption key or an identifier into a terminal-specific driver.

In the first and second embodiments, a portion of a driver of the image forming apparatus 1 where an encryption key AK or an identifier SK is incorporated (embedded) is not particularly limited. As shown in FIG. 26, however, it is desirable that an encryption key AK or an identifier SK is incorporated into a module relating to selection of printing conditions among modules constituting a driver.

Then, in the case where printing conditions for the information processing apparatus 3 are changed, only a module in which the printing conditions are reflected and a new encryption key AK or identifier SK is incorporated may be given to the information processing apparatus 3. The information processing apparatus 3 preferably replaces an old module in the driver with a new module.

In the first and second embodiments, the descriptions are provided of the case where the image forming apparatus 1 is caused to perform a printing process. However, the present invention can be applied to the case where the image forming apparatus 1 is caused to perform FAX transmission or image editing processing.

In the embodiments described above, the overall configuration of the image processing system GSS, the image forming apparatus 1, the driver management apparatus 2 and the information processing apparatus 3, the configurations of various portions thereof, the details of processing, the processing order, the structures of the databases, and the like may be changed as needed, in accordance with the subject matter of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A method for limiting a service in a network system, the network system including a server that provides a service and one or more clients that are served, the method comprising:

giving option designation permission information and a first key to the client with the option designation permission information associated with the first key, the option designation permission information indicating, among options of the service, an option that is allowed to be designated by the client or an option that is prohibited from being designated by the client;

giving the server a second key corresponding to the first key of each of the clients;

performing, by the client, processing of generating service content data within a range of options that are indicated in the option designation permission information of the client itself and can be designated, the service content data indicating a content of the service to be obtained from the server;

performing, by the client, processing of encrypting the service content data thus generated using the first key of the client itself;

performing, by the client, processing of sending the service content data thus encrypted to the server;

performing, by the server, processing of decoding the service content data received from the client using the second key of the client;

performing, by the server, processing for the service based on the service content data thus decoded; and wherein the second key is created by an apparatus external to the server before the second key is given to the server.

2. The method according to claim 1, wherein
the server is an image forming apparatus,
the service means that the image forming apparatus performs image processing in accordance with a request for the image processing made by the client,
the options of the service are image processing conditions,
the option designation permission information is processing conditions designation permission information indicating image processing conditions that are allowed to be designated by the client or image processing conditions that are prohibited from being designated by the client, and
the service content data is image processing content data indicating a content of the image processing that the client requests the image forming apparatus to perform.

3. The method according to claim 2, further comprising giving the client the processing conditions designation permission information and the first key that are associated with each other, by giving the client a driver of the image-forming apparatus, the driver incorporating the processing conditions designation permission information and the first key.

4. The method according to claim 2, further comprising giving the client the processing conditions designation permission information and the first key that are associated with each other, by giving the client a driver of the image forming apparatus, the driver incorporating the first key and being edited so that a user can designate processing conditions only within a range of processing conditions that are indicated in the processing conditions designation permission information and can be designated.

5. The method according to claim 2, further comprising giving the client the processing conditions designation permission information and the first key that are associated with each other, by giving the client a module constituting a driver of the image forming apparatus, the module incorporating the processing conditions designation permission information and the first key.

6. The method according to claim 2, wherein
the client encrypts the image processing content data by common key cryptography,
the image forming apparatus decodes the image processing content data by the common key cryptography, and
the first key that is given to the client is identical to the second key that is given to the image forming apparatus and corresponds to the first key.

7. A method for limiting a service in a network system, the network system including a server that provides a service and one or more clients that are served, the method comprising:

giving option designation permission information and a first identifier to the client with the option designation permission information associated with the first identifier, the option designation permission information indicating, among options of the service, an option that is allowed to be designated by the client or an option that is prohibited from being designated by the client;

giving the server a second identifier corresponding to the first identifier of each of the clients;

performing, by the client, processing of generating service content data within a range of options that are indicated in the option designation permission information of the client itself and can be designated, the service content data indicating a content of the service to be obtained from the server;

performing, by the client, processing of sending to the server the service content data thus generated together with the first identifier of the client itself; performing, by the server, processing of determining whether or not the first identifier received from the client and the second identifier of the client have a predetermined relationship;

performing, by the server, processing for the service based on the service content data that is received together with the first identifier only in the case where it is determined that the first identifier received from the client and the second identifier of the client have the predetermined relationship; and wherein the second identifier is created by an apparatus external to the server before the second identifier is given to the server.

8. The method according to claim 7, wherein
the server is an image forming apparatus,
the service means that the image forming apparatus performs image processing in accordance with a request for the image processing made by the client,
the options of the service are image processing conditions,
the option designation permission information is processing conditions designation permission information indicating image processing conditions that are allowed to be designated by the client or image processing conditions that are prohibited from being designated by the client, and
the service content data is image processing content data indicating a content of the image processing that the client requests the image forming apparatus to perform.

9. The method according to claim 8, further comprising giving the client the processing conditions designation permission information and the first identifier that are associated with each other, by giving the client a driver of the image forming apparatus, the driver incorporating the processing conditions designation permission, information and the first identifier.

10. The method according to claim 8, further comprising giving the client the processing conditions designation permission information and the first identifier that are associated with each other, by giving the client a driver of the image forming apparatus, the driver incorporating the first identifier and being edited so that a user can designate processing conditions only within a range of processing conditions that are indicated in the processing conditions designation permission information and can be designated.

11. The method according to claim 8, further comprising giving the client the processing conditions designation permission information and the first identifier that are associated with each other, by giving the client a module constituting a driver of the image forming apparatus, the module incorporating the processing conditions designation permission information and the first identifier.

12. The method according to claim 8, wherein,
the first identifier that is given to the client and the second identifier that is given to the image forming apparatus and corresponds to the first identifier are made up of an identical letter string, and
the predetermined relationship means that the first identifier received from the client is identical to the second identifier of the client.

13. An image processing system comprising an image forming apparatus, one or more clients that request the image forming apparatus to perform image processing, and a driver providing apparatus that provides a driver for the image forming apparatus,
the driver providing apparatus including
a driver transmission portion that sends a driver for the image forming apparatus to the client, the driver incorporating a first key and processing conditions designation permission information that indicates, among processing conditions for the image processing, processing conditions that are allowed to be designated by the client or processing conditions that are prohibited from being designated by the client, and
a key transmission portion that sends the image forming apparatus a second key corresponding to the first key of each of the clients,
the client including
an image processing content data generation portion that generates image processing content data within a range of processing conditions that are indicated in the processing conditions designation permission information of the driver received from the driver providing apparatus and can be designated, the image processing content data indicating a content of the image processing to be requested of the image forming apparatus,
an encryption portion that encrypts the image processing content data thus generated using the first key that is incorporated into the driver received from the driver providing apparatus, and
an image processing request portion that requests execution of the image processing by sending the image processing content data thus encrypted to the image forming apparatus, and
the image forming apparatus including
a decoding portion that decodes the image processing content data received from the client using the second key of the client, the second key being received from the driver providing apparatus, and
an image processing portion that executes the image processing based on the image processing content data thus decoded, and
wherein the driver providing apparatus is external to the image forming apparatus, and the driver providing apparatus creates the second key before transmitting the second key to the image forming apparatus.

14. An image processing system comprising an image forming apparatus, one or more clients that request the image forming apparatus to perform image processing, and a driver providing apparatus that provides a driver for the image forming apparatus,
the driver providing apparatus including
a driver transmission portion that sends a driver for the image forming apparatus to the client, the driver incorporating a first identifier and processing conditions designation permission information that indicates, among processing conditions for the image processing, processing conditions that are allowed to be designated by the client or processing conditions that are prohibited from being designated by the client, and
an identifier transmission portion that sends the image forming apparatus a second identifier corresponding to the first identifier of each of the clients,
the client including
an image processing content data generation portion that generates image processing content data within a range of processing conditions that are indicated in the processing conditions designation permission information of the driver received from the driver providing apparatus and can be designated, the image processing content data indicating a content of the image processing to be requested of the image forming apparatus, and
an image processing request portion that requests execution of the image processing by sending the image processing content data thus generated together with the first identifier that is incorporated into the driver received from the driver providing apparatus, and
the image forming apparatus including
a determination portion that determines whether or not the first identifier received from the client and the second identifier of the client have a predetermined relationship, and
an image processing portion that executes the image processing based on the image processing content data that is received together with the first identifier only in the case where it is determined that the first identifier received from the client and the second identifier of the client have the predetermined relationship, and
wherein the driver providing apparatus is external to the image forming apparatus, and the driver providing apparatus creates the second identifier before transmitting the second identifier to the image forming apparatus.

15. An image forming apparatus configured to communicate with a driver providing apparatus and one or more clients, the driver providing apparatus sending a driver for the image forming apparatus to the one or more clients, the driver incorporating a first key and processing conditions designation permission information that indicates, among processing conditions for the image processing, processing conditions that are allowed to be designated by the one or more clients or processing conditions that are prohibited from being designated by the one or more clients, the driver providing apparatus sending the image forming apparatus a second key corresponding to the first key incorporated into the driver sent to the one or more clients, the one or more clients generating image processing content data within a range of processing conditions that are indicated in the processing conditions designation permission information of the driver received from the driver providing apparatus and which can be designated, the image processing content data indicating a content of the image processing to be requested of the image forming apparatus, the one or more clients encrypting the image processing content data generated using the first key that is incorporated into the driver received from the driver providing apparatus, the one or more clients requesting execution of the image processing by sending the encrypted image processing content data to the image forming apparatus, the image forming apparatus comprising:

a receiving unit configured to receive, from the driver providing apparatus, the second key corresponding to the first key incorporated into the driver sent to the one or more clients by the driver providing apparatus;

the receiving unit being configured to receive, from the one or more clients, the image processing content data encrypted by the one or more clients using the first key incorporated into the driver sent to the one or more clients by the driver providing apparatus;

a decoding unit configured to decode the encrypted processing content data received from the one or more clients by using the second key received from the driver providing apparatus;

an executing unit configured to execute image processing based on the image processing content data only if the decoding unit successfully decodes the image processing content data by using the second key received from the driver providing apparatus; and wherein the driver providing apparatus is external to the image forming apparatus, and the driver providing apparatus creates the second key before transmitting the second key to the image forming apparatus.

\* \* \* \* \*